(12) United States Patent  
Vendrow

(10) Patent No.: US 9,055,014 B2
(45) Date of Patent: *Jun. 9, 2015

(54) SYSTEM AND METHOD FOR PROVIDING A PROTOCOL FOR MESSAGE DATA

(71) Applicant: Advanced Messaging Technologies, Inc., Los Angeles, CA (US)

(72) Inventor: Vlad Vendrow, San Mateo, CA (US)

(73) Assignee: Advanced Messaging Technologies, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/164,760

(22) Filed: Jan. 27, 2014

(65) Prior Publication Data

US 2014/0143317 A1 May 22, 2014

Related U.S. Application Data

(63) Continuation of application No. 13/623,770, filed on Sep. 20, 2012, now Pat. No. 8,639,754.

(60) Provisional application No. 61/541,998, filed on Sep. 30, 2011.

(51) Int. Cl.
*G06F 15/16* (2006.01)
*H04L 12/58* (2006.01)
*H04L 29/08* (2006.01)

(52) U.S. Cl.
CPC ............. *H04L 51/066* (2013.01); *H04L 67/36* (2013.01); *H04L 67/141* (2013.01); *H04L 51/36* (2013.01)

(58) Field of Classification Search
None
See application file for complete search history.

(56) References Cited

U.S. PATENT DOCUMENTS

| | | | |
|---|---|---|---|
| 6,350,066 B1 | 2/2002 | Bobo | |
| 6,714,952 B2 | 3/2004 | Dunham et al. | |
| 6,718,372 B1 | 4/2004 | Bober | |
| 6,938,079 B1 | 8/2005 | Anderson | |
| 7,702,669 B2 | 4/2010 | Vendrow | |
| 7,752,326 B2 | 7/2010 | Smit | |
| 8,060,639 B2 | 11/2011 | Smit | |
| 8,280,353 B2 * | 10/2012 | Patron et al. | 455/412.1 |
| 8,433,797 B2 | 4/2013 | Vendrow | |
| 8,660,537 B2 * | 2/2014 | Lewis et al. | 455/412.1 |

(Continued)

OTHER PUBLICATIONS

U.S. Appl. No. 13/084,519, filed Apr. 11, 2011, entitled "Accessing User Messages at a Hosted Communications Provider," inventors: Vlad Vendrow et al, 39 pages.

*Primary Examiner* — Mohamed Ibrahim
(74) *Attorney, Agent, or Firm* — Kenyon & Kenyon LLP

(57) ABSTRACT

Described herein are systems and methods for enabling access to messages on a message service system via user interfaces of receiving client devices. The message service system comprises a message storage system and a message access system. The message storage system receives messages from sending client devices and stores message data. The message access system comprises a message server and UI server. A receiving client device is connected with the UI server through a first HTTP connection for receiving UI data for building webpages of the user interface and is connected with the message server through a second non-HTTP connection for receiving message data for populating the webpages. The UI data does not comprise any message data. A client protocol engine on the receiving client device and a server protocol engine on the message server define and provide the non-HTTP protocol for receiving and transmitting message data.

39 Claims, 28 Drawing Sheets

(56) References Cited

U.S. PATENT DOCUMENTS

| | | |
|---|---|---|
| 2003/0110212 A1* | 6/2003 | Lewis .......................... 709/203 |
| 2007/0174398 A1 | 7/2007 | Addante |
| 2008/0201389 A1 | 8/2008 | Cohen et al. |
| 2009/0150486 A1 | 6/2009 | Franco et al. |
| 2009/0305221 A1 | 12/2009 | Gorup |
| 2011/0072114 A1 | 3/2011 | Hoffert et al. |
| 2011/0119722 A1 | 5/2011 | Kellerman |
| 2011/0119723 A1 | 5/2011 | Erickson |
| 2011/0125594 A1 | 5/2011 | Brown |
| 2011/0161348 A1 | 6/2011 | Oron |
| 2011/0231265 A1 | 9/2011 | Brown |
| 2012/0054777 A1 | 3/2012 | Xiques |
| 2012/0096092 A1 | 4/2012 | Davidge |
| 2012/0173981 A1 | 7/2012 | Day |

* cited by examiner

SYSTEM AND METHOD FOR PROVIDING A PROTOCOL FOR MESSAGE DATA

RELATED APPLICATIONS

This patent application is a continuation of U.S. application Ser. No. 13/623,770, filed Sep. 20, 2012, entitled "SYSTEM AND METHOD FOR PROVIDING A PROTOCOL FOR MESSAGE DATA", which issued on Jan. 28, 2014 as U.S. Pat. No. 8,639,754, which is expressly incorporated herein by reference, and which claims the benefit of priority under 35 U.S.C. §119(e) of U.S. Provisional Application No. 61/541,998, filed Sep. 30, 2011, which is also expressly incorporated herein by reference.

COPYRIGHT

Figures included in this patent document contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to all software, data, and user interfaces described below and in the drawings that form a part of this document: Copyright 2011 RingCentral, Inc. All Rights Reserved.

FIELD OF THE INVENTION

The present invention relates to message systems and, more specifically, to systems, methods and techniques for providing a protocol for message data.

BACKGROUND OF THE INVENTION

Message systems of the type with which the invention may find particular utility may be maintained by a business or other organization for use by its own personnel, or by a communications services provider that provides its services on behalf of its customers and their personnel. The message system may receive, store, and provide access to messages through a network, such as the Internet. Messages may be sent from a sending client device (e.g., fax machine, cell phone, etc.) through the Internet and/or a Public-Switched Telephone Network (PSTN) and eventually routed to the message system. The messages may then be converted to a digital message file in a particular format, if not already in that format, and stored by the message system. For example, a facsimile message may be converted to portable document format (pdf) and stored as a .pdf file on the message system and a voice message may be converted to MP3 format and stored as an .mp3 file on the message system.

To provide access to the messages, the message system may provide a website that provides remotely located and often geographically dispersed recipients access to a list of their messages, and may include a server to furnish the message list as well as those messages stored in the message system that are selected by the intended recipients. The messages are typically furnished in a well-known format, such as in hyper-text mark-up language (HTML).

The intended recipient of the messages may use a receiving client device to access his/her messages stored on and assessable from the message system. The receiving client device may have a browser to provide a user interface (UI) that permits access to the messages through the Internet. Typically, a UI formatted in hyper-text mark-up language (HTML) may be used to access facsimile or voice messages on the message system. For example, the UI may display the list of messages described above, and, in response to "selection" by the recipient of a particular facsimile message, may display the facsimile message through a separate document viewer program in a popup window or playback a voice message through a separate audio player program in a popup window.

However, as different types of messages and formats increase, the complexity of providing access to the messages also increases. In particular, conventional UIs are limited in their capability of presenting messages and formats of widely varying types. Further, conventional UIs are not able to meet user demand for a more seamless and easier way to access messages from the message system.

SUMMARY

Described herein are systems and methods for enabling access by intended recipients to messages on a message service system via user interfaces of client devices. The message service system comprises a message storage system and a message access system, e.g., both located at a datacenter. The message storage system receives messages from sending client devices and stores messages in varying types and formats. The message access system provides access to the messages stored on the message storage system by intended recipients of the messages.

The message access system comprises different types of servers with different functions, namely, a program server, message server, and UI server. The program server stores a message data communicator file in a suitable format and transfers or serves the message data communicator file to one or more client devices. Preferably, the message data communicator file comprises only Adobe® Flash® programming instructions (as specified by Adobe Systems Incorporated), which lack any markup language. As such, the message data communicator file comprises an interpretable file or files having only interpretable and executable program instructions compatible with a Flash® Player. Preferably, the message data communicator file is in the Small Web Format (SWF) format as an .swf file.

A client device may download the message data communicator file over a network, such as the Internet. Once downloaded and installed, the client device may comprise a message data communicator engine having computer hardware configured by the message data communicator file. The message data communicator engine comprises a client protocol engine that interacts with a server protocol engine on the message server. Preferably, the server protocol engine is also configured by only Flash programming instructions. As such, the message data communicator engine, client protocol engine, and server protocol engine may be compatible with a Flash Player. The client and server protocol engines define and provide a non-HTTP protocol for receiving and transmitting message data. More specifically, in response to requests from the message data communicator engine, the message server retrieves message information and message files and uses the server protocol engine to transmit the message information and files to the client protocol engine of the client device using the non-HTTP protocol.

To access the messages, the client device also includes a web browser comprising an HTML UI (capable of rendering and displaying HTML documents) to interact with the message access system through a network, such as the Internet. The HTML UI may comprise a JavaScript plug-in program that submits requests for and receives message data from the message server (using the non-HTTP protocol) and submits requests for and receives UI data from the UI server (using an HTTP protocol). The UI data comprises data used to build the webpages of the HTML UI. For example, the UI data may comprise HTML formatted text, graphics, tables, and/or selectable icons for producing various webpages for accessing messages of the message service system. The UI data does not comprise any message data.

As such, different connection paths and network protocols are used for UI data and message data. In these embodiments, an HTTP protocol may be used on a first connection, between the client device and the UI server, to provide UI data for producing webpages for an HTML UI and a non-HTTP protocol may be used on a second connection, between the client device and the message server, to provide message data for providing message information and message files to the HTML UI. In some embodiments, the UI and message servers are simultaneously connected with the client device and the UI server transmits UI data through the first HTTP connection while the message server transmits message data through the second non-HTTP connection. As such, the receiving client device may simultaneously (in parallel) receive and process UI data through the first HTTP connection and receive and process message data through the second non-HTTP connection. In this manner, webpages of the HTML UI and message data that populates the webpages may be received and displayed on the client device faster than when using only a single server for providing both UI data and message data. In other embodiments, the UI and UI server may communicate through multiple, simultaneous HTTP connections, and the UI and message server may communicate through multiple, simultaneous non-HTTP connections. This further facilitates the parallel transfer of data and allows the system to use different non-HTTP protocols simultaneously, where certain non-HTTP protocols may be more suited for some functions than others. For example, the UI may download message data that does not include audio data associated with a voicemail through a custom protocol. At the same time, the UI may download the audio data associated with a voicemail (e.g., pulse code modulation audio data formatted as a .WAV data stream) for streaming through a player that supports FTP-based streaming.

The message storage system may store messages of various message types, including facsimile, text, voice/audio, video, picture messages, or any combination thereof, depending on the implementation. A message file may have associated metadata describing the message file, such as a size of the message, identifier for the sending client device, a user identifier for the intended recipient, the message type, the date and time the message was received, etc. The associated metadata may be referred to herein as "message information." The message information may be stored along with the associated message file in the message storage system and transmitted to various components. The message information may be stored and transmitted in a non-markup language format, such as a comma-delimited format, JavaScript Object Notation (JSON), or any other type of non-markup language format. A message list comprising message information of current message may be transmitted to the client device at the start of a "message session" with the client device.

In some embodiments, the non-HTTP protocol is configured to allow the message server to "push" message data to client devices, whereby message data is sent to a client device without receiving any request for message data from the client device. The message service system may "push" (send) message data comprising "immediate notifications" of new messages and calls to the client device automatically when any new message or call is received. An "immediate notification" relates to a new message or new call for the user that is received and processed by the message service system and the new message and the message or call information is stored to the message storage system during a "message session" time period when the user is currently reviewing and accessing his/her current messages using the HTML UI.

The message session time period begins from a first event and ends at a second event. The first event may comprise the approximate point in time when the client device requests a message list of current messages for the user and the message server sends the message list to the client device. The second event may comprise the approximate point in time that the message server receives a "session-end" request from the client device. For example, the session-end request may comprise a user logout request or a user request to close the HTML UI. As such, immediate notifications relate to only those new messages or calls received by the message service system during the message session with the client device and are not represented or included in the message list of current messages that is sent to the client device at the beginning of the message session.

BRIEF DESCRIPTION OF THE DRAWINGS

The novel features are set forth in the appended claims. However, for purpose of explanation, several embodiments of the invention are set forth in the following figures.

DETAILED DESCRIPTION

Figure 1:
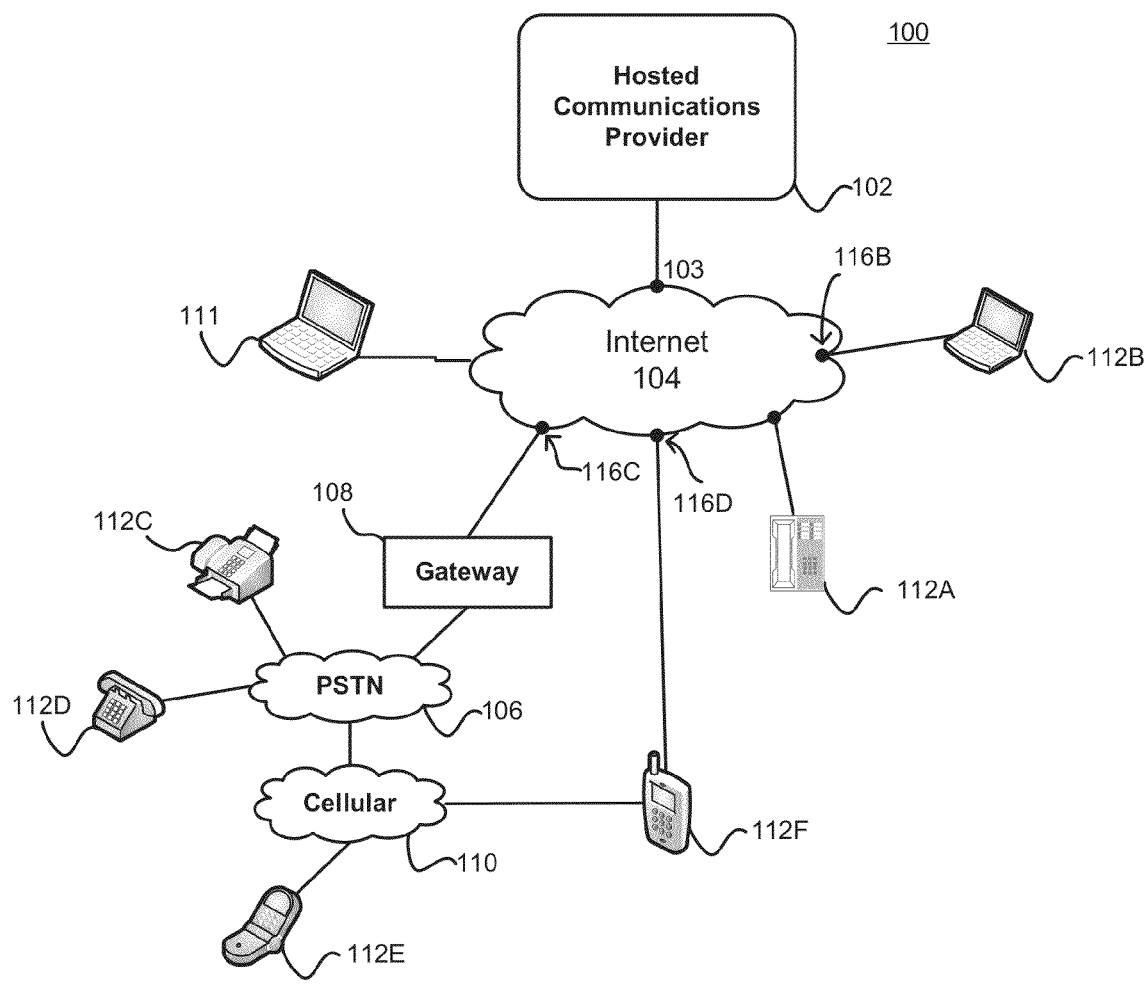
FIG. 1 shows an example of a high-level block diagram of a communications network.

The disclosure of U.S. Provisional Application No. 61/541, 998, filed Sep. 30, 2011, entitled "SYSTEM AND METHOD FOR PROVIDING A PROTOCOL FOR MESSAGE DATA," is expressly incorporated herein by reference.

In the following description, numerous details are set forth for purpose of explanation. However, one of ordinary skill in the art will realize that the embodiments described herein may be practiced without the use of these specific details. In other instances, well-known structures and devices are shown in block diagram form in order to not obscure the description with unnecessary detail.

The description that follows is divided into five sections. Section I contains terms used herein. Section II describes a message environment in which some embodiments operate. Section III describes a message service system and a Flash UI engine for accessing messages. Section IV describes screen shots and functions of the Flash UI engine. Section V describes a system and method for providing a protocol for message data.

I. TERMS

Flash UI: The Flash UI comprises a Flash UI engine having computer hardware configured by an interpretable Flash media UI file, comprising programming instructions without markup language, to perform embodiments herein. The Flash UI engine comprises a message UI engine, a settings UI engine, and one or more embedded application engines, each such engine comprising computer hardware configured by the Flash media UI file to perform embodiments herein. The Flash UI engine is compatible with a Flash® Player. As used herein, the terms "message UI" and "message UI engine" may be used interchangeably, and the terms "settings UI" and "settings UI engine" may be used interchangeably.

Flash media UI file: The Flash media UI file comprises an interpretable file (a file able to be interpreted) having only program instructions that are interpretable and executable by a computer processor. An interpretable file may comprise a file that is "indirectly" executed (i.e., "interpreted") by an interpreter program. The Flash UI engine may include a computer processor that executes the Flash media UI file to perform embodiments herein. The Flash media UI file may comprise programming instructions for a message UI, a settings UI, and one or more embedded applications for performing various functions described herein. Preferably, the Flash media UI file is in the Small Web Format (SWF) format as a .swf file. The Flash media UI file does not comprise any markup language, whereby the Flash media UI file comprises a file format other than markup language format. Preferably, the Flash media UI file comprises only Flash® programming instructions.

Message/message file: As used herein, a message is received from a sending client device and converted and stored as a digital "message file." Message files may comprise a plurality of different message types (e.g., fax, text, audio, video, picture, etc., or any combination thereof depending on the implementation) converted to a plurality of different format types (e.g., MP3, TIFF, pdf, etc.). Message files are presented (e.g., displayed or played back) to the user using an appropriate embedded application within the message UI. The embodiments below are described in relation to a file. In other embodiments, any other type of storage object other than a file may be used. As used herein, a storage object comprises any logically definable storage element stored or contained within a storage system (such as a file, logical unit, volume, aggregate, storage device, etc.). In these embodiments, a storage object comprises any type of container for storing and/or transferring data.

Message information: A message file may have associated metadata describing the message file, such as a size of the message (e.g., time length of the message, number of pages of the message), identifier for the sending client device (e.g., sender name and/or phone number), a user identifier for the intended recipient (e.g., username and/or phone number), the message type, the date and time the message was received, etc. The associated metadata may be referred to herein as "message information." The message information may be formatted in a non-markup language, such as comma-delimited format.

Message list: A "message list" for a user may present message information about all, or a subset, of the messages associated with a user.

Message data: The message files and associated message information may be referred to collectively as "message data."

Sending client device: As used herein, a sending client device is used by a sender of a message for producing and transmitting messages. Examples of a sending client device include a fax machine, a cellular phone, smartphone, Voice Over IP (VoIP) phone, a computer configured to run communications software applications, a telephone, etc.

Receiving client device: As used herein, a receiving client device is used by an intended recipient of messages (referred to herein as a "user") to access messages on the message service system. The intended recipient is a current user/subscriber of the message service system. Examples of a receiving client device include a computer desktop, laptop, cellular phone, smartphone, etc.

Message service system: As used herein, a message service system comprises a message storage system and a message access system. The message storage system may receive messages from sending client devices and store messages of varying types and formats. The message access system may provide access to the stored messages to receiving client devices. The message access system may comprise a program server (for storing and transferring a message UI), a message server (for providing access to messages and message information), and an account database (for storing message information regarding the messages).

II. MESSAGE ENVIRONMENT

FIG. 1 is an example of a block diagram of a communications network 100. The communications network 100 includes a hosted communications provider 102, a packet-switched network (such as the Internet) 104, a PSTN 106, a PSTN-VoIP gateway 108, a cellular network 110, a client computer 111, and communication devices 112A-112F. The communication devices 112 include a VoIP phone 112A, a computer 112B configured to run communications software applications (e.g. VoIP, voice, audio, video, facsimile, or data applications), a fax machine 112C, a telephone 112D, a cellular phone 112E, and a multi-mode phone 112F. It should be noted that although client computer 111 and computer 112B are shown in FIG. 1 as notebook computers, they are not limited to being notebook computers; any computing device such as a desktop computer, server, computing tablet, computing personal accessory, etc. can be considered to be a computer 112B for the purposes of the description herein.

The hosted communications provider 102 is connected to the Internet 104. Transmissions to and from the hosted communications provider 102 between the Internet 104 and the PSTN 106 pass through the PSTN-VoIP gateway 108. The PSTN 106 is also in communication with the cellular network 110.

The hosted communications provider 102 provides messaging services to its users via its connection 103 to the Internet 104. A user of the hosted communications provider 102 can initiate or receive communications from any of the communication devices 112A-112F shown in FIG. 1. The VoIP phone 112A and the computer 112B can communicate using internet protocols; they communicate with the hosted communications provider 102 through the Internet 104. The fax machine 112C and the telephone 112D are connected to the PSTN 106; their communications with the hosted communications provider 102 pass through the PSTN-VoIP gateway 108. The PSTN-VoIP gateway 108 converts packets it receives from the Internet 104 into a format compatible for transmission across the PSTN 106, such as time-division multiplexing (TDM). The PSTN-VoIP gateway 108 also converts signals received from the PSTN 106 into IP packets for transmission over the Internet 104.

The cellular phone 112E is connected to the cellular network 110; it communicates with the hosted communications provider 102 via the cellular network 110 to the PSTN 106 to the PSTN-VoIP gateway 108. The multi-mode phone 112F can communicate with the hosted communications provider 102 via either the cellular network 110 or through its own connection to the Internet 104. The number and types of communication devices 112 shown in FIG. 1 are not exhaustive, and other configurations are possible. For example, a traditional analog telephone can be connected to the Internet 104 (e.g., in place of the PSTN 106) by using an Analog Telephone Adapter (ATA).

The hosted communications provider 102 provides VoIP and other media services through its Internet connection. There are various protocols used to send real-time multimedia (including voice and video communications) over the Internet 104. Session Initiation Protocol (SIP) is one protocol used to establish, transfer, and end sessions between communication devices and the hosted communications provider 102 across the Internet 104. The SIP signaling protocol is described further in Request For Comments (RFC) 3261, entitled "SIP: Session Initiation Protocol," by J. Rosenberg et al., June 2002, published by the Internet Engineering Task Force (IETF). Real-time Transport Protocol (RTP) is another protocol used to transport multimedia data packets across the Internet. The RTP protocol is described further in RFC 3550, entitled "RTP: A Transport Protocol for Real-Time Applications," by H. Schu18rinne et al., July 2003, published by the IETF. SIP and RTP are used herein as examples of protocols for illustrative purposes only, but there are many other protocols that can be used in IP telephony including, but not limited to: the protocols defined by the International Telecommunication Union Telecommunication Standardization Sector (ITU-T) H.323 standard, and proprietary protocols such as those used by Skype® VoIP Services, of Silver Lake Partners.

A caller can use any of the communication devices 112 shown in FIG. 1 to leave a voice, fax, or text message with a user of the hosted communications provider 102. For example, a caller can use the VoIP phone 112A to leave a voicemail message for the user. (The caller may or may not be another user of the hosted communications provider 102). The caller initiates the call from the VoIP phone 112A, dialing a number associated with the user. The call is received by the hosted communications provider 102, which recognizes that the number belongs to one of its users. The caller leaves a voice message, which is received and stored by the hosted communications provider 102 for later access by the user. Similarly, a caller can use the fax 112C to send a fax message to the user, or cellular phone 112E to send a text message to the user. The voice, fax, or text message can all be received and stored by the hosted communications provider 102.

The message can reach the user in various ways. For example, the hosted communications provider 102 can email the message to the user as soon as it is received by attaching the message to the email, e.g. as an audio file in the case of voicemail, or as an image file in the case of a facsimile. The user can also use a local client computer 111 to login to the user's account at the hosted communications provider 102 to check for the availability of any messages, and to download messages as desired to the user's local client computer. This latter method is discussed in further detail below.

Figure 2:
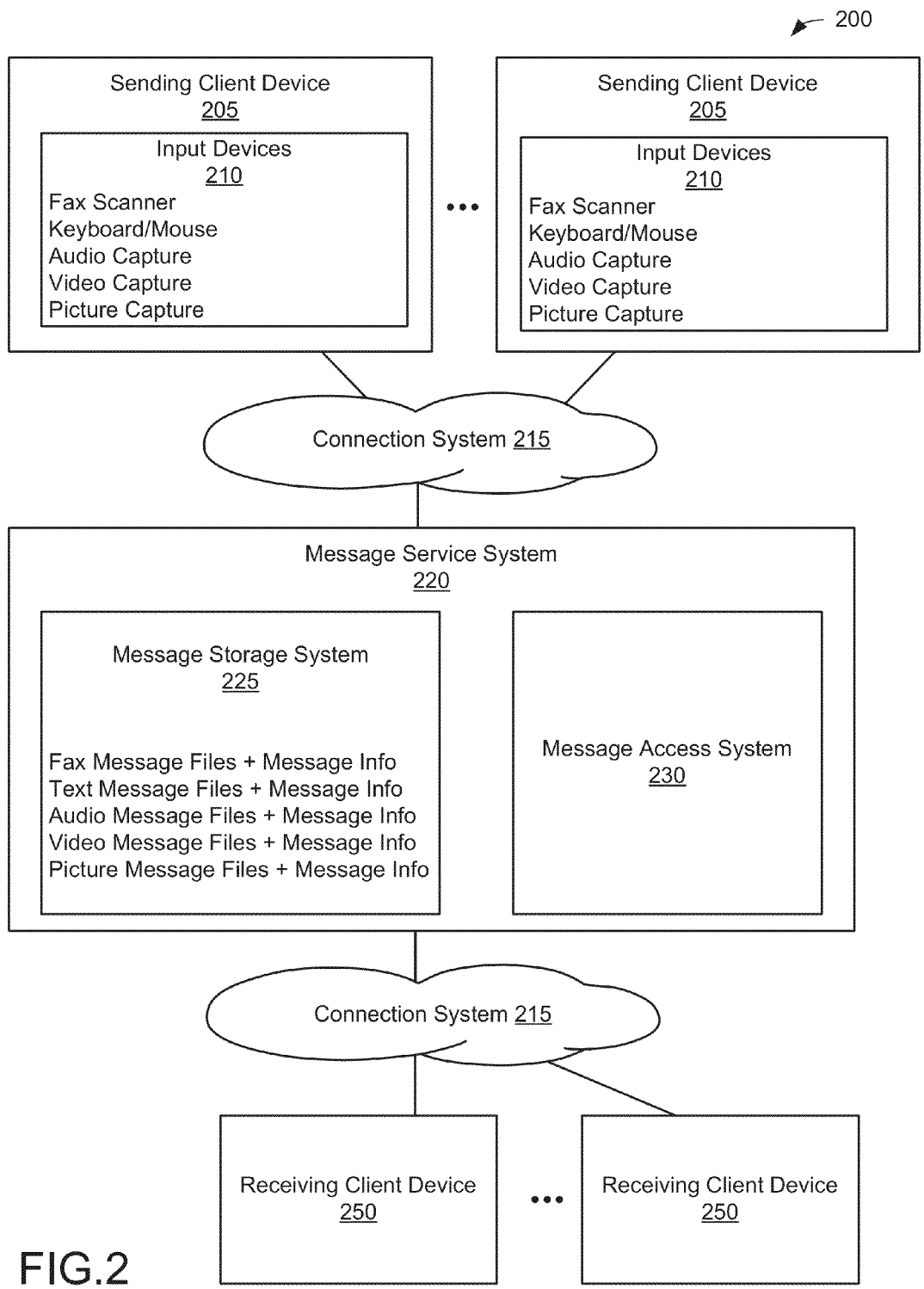
FIG. 2 is a block diagram of an exemplary message environment in which some embodiments operate.

FIG. 2 is a block diagram of an exemplary message environment 200 in which some embodiments operate. The environment 200 comprises a plurality of sending client devices 205, a connection system 215, a message service system 220 (comprising a message storage system 225 and a message access system 230), and a plurality of receiving client devices 250.

The sending client devices 205 may be coupled to the message service system 220 through a connection system 215. Likewise, the receiving client devices 250 may be coupled to the message service system 220 through a connection system 215. Each sending client device 205 may send messages to intended recipients through the connection system 215. The messages may be routed through the connection system 215 to the message service system 220.

The sending client device 205 may comprise any variety of devices capable of sending a message. For example, a sending client device 205 may comprise any communication device 112 shown in FIG. 1, such as VoIP phone 112A, a computer 112B configured to run communications software applications (e.g. VoIP, voice, audio, video, facsimile, or data applications), a fax machine 112C, a telephone 112D, a cellular phone 112E, and a multimode phone 112F. It should be noted that although computer 112B are shown in FIG. 1 as a notebook computer, it is not limited to being a notebook computer; any computing device such as a desktop computer, server, computing tablet, computing personal accessory, etc. can be considered to be a computer 112B for the purposes of the description herein.

As shown in FIG. 2, a sending client device 205 may comprise various input devices 210 for producing various types of messages. An input device 210 may be of any type that allows the sender to provide input into the sending client device 205 for producing a message. For example, the input devices 210 may include a fax scanner device for producing fax messages, a keyboard and/or mouse for producing text messages, a voice/audio capture device for producing voice/audio messages, a video capture device for producing video messages, and a picture capture device (camera) for producing picture messages. An input device 210 may also comprise a device for inputting user selections and text, such as a mouse, trackball, keyboard, etc.

Each sending client device 205 may further comprise various computer hardware components configured for implementing embodiments described herein. For example, a sending client device 205 may comprise a computing device 1100 or a mobile computing device 1150 shown in FIG. 11. The sending client device 205 may include the various computer hardware components (e.g., processor 1102, memory 1104, storage device 1106) of the computing devices 1100 or 1150 that are configured for implementing embodiments described herein. These computer hardware components are described in relation to FIG. 11 and are not discussed in detail here.

Each sending client device 205 may send messages that sent through the connection system 215 to the message service system 220. The connection system 215 may comprise various computer networks, telephone networks, cellular networks, and communication devices for connecting a sending client device 205 to the message service system 220. For example, the connection system 215 may comprise the packet switched network (such as the Internet) 104, the public switched telephone network (PSTN) 106, the PSTN-VoIP gateway 108, and the cellular network 110 shown in FIG. 1. These connection system 215 components are described in relation to FIG. 1 and are not discussed in detail here. For the purposes of illustrating the connection system 215 between the sending client device 205 and the message service system 220, the sending client device 205 may comprise any communication device 112 shown in FIG. 1 and the message service system 220 may comprise the hosted communications provider 102 shown in FIG. 1.

The messages, from the sending client devices 205, are received by the message service system 220 and stored to the message storage system 225. Each received message may be stored as a digital message file in a particular format type. The message files may comprise a plurality of different message types converted to a plurality of different format types. In the example shown in FIG. 2, the message storage system 225 may store fax message files, text message files, voice/audio message files, video message files, picture message files, or any combination thereof.

Examples of different format types for fax message files include Portable Document Format (PDF), Flexible Image Transport System (FITS), Tagged Image File Format (TIFF), etc. Examples of different format types for text message files include Plain Text, PDF, .doc, etc. Examples of different format types for voice/audio message files include WAV, MP3, MP4, AIFF (IFF file format), Extensible Music Format (XMF), etc. Examples of different format types for video message files include 3GP, AVI, Flash Video (FLV, F4V), QuickTime File Format, MP4, RealMedia (RM), etc. Examples of different format types for picture message files include Joint Photographic Experts Group (JPEG), TIFF, Portable Network Graphics (PNG), etc.

With each message file, the message service system 220 may also produce and store message information describing the message file, such as a size of the message (e.g., time length of the message, number of pages of the message), identifier for the sending client device (e.g., phone number and/or sender name), the message type (fax, text, audio, etc.), the date and time the message was received, etc. The message information may be stored along with the associated message file in the message storage system 220 and transmitted to various components along with the associated message file or may be separately transmitted to various components. The message information may be formatted in a non-markup language, such as comma-delimited format.

As shown in FIG. 2, the exemplary message environment 200 also includes a plurality of receiving client devices 250 coupled to the message service system 220 through the connection system 215. A receiving client device 250 is used by an intended recipient ("user") of a message. A receiving client device 250 may comprise any variety of devices capable of accessing messages. For example, a receiving client device 250 may comprise a computer 111 or mobile device (e.g., cellular phone 112E, multimode phone 112F, smartphone, etc.).

The message access system 230 of the message service system 220 interacts with the receiving client devices 250 to provide access to messages and associated message information stored on the message storage system 225. A receiving client device 250 provides a Flash UI that interacts with the message access system 230 to access messages and associated message information, as described below in Section III.

III. MESSAGE SERVICE SYSTEM AND MESSAGE UI FOR ACCESSING MESSAGES

A. Message Access System and Receiving Client Device

Figure 3:
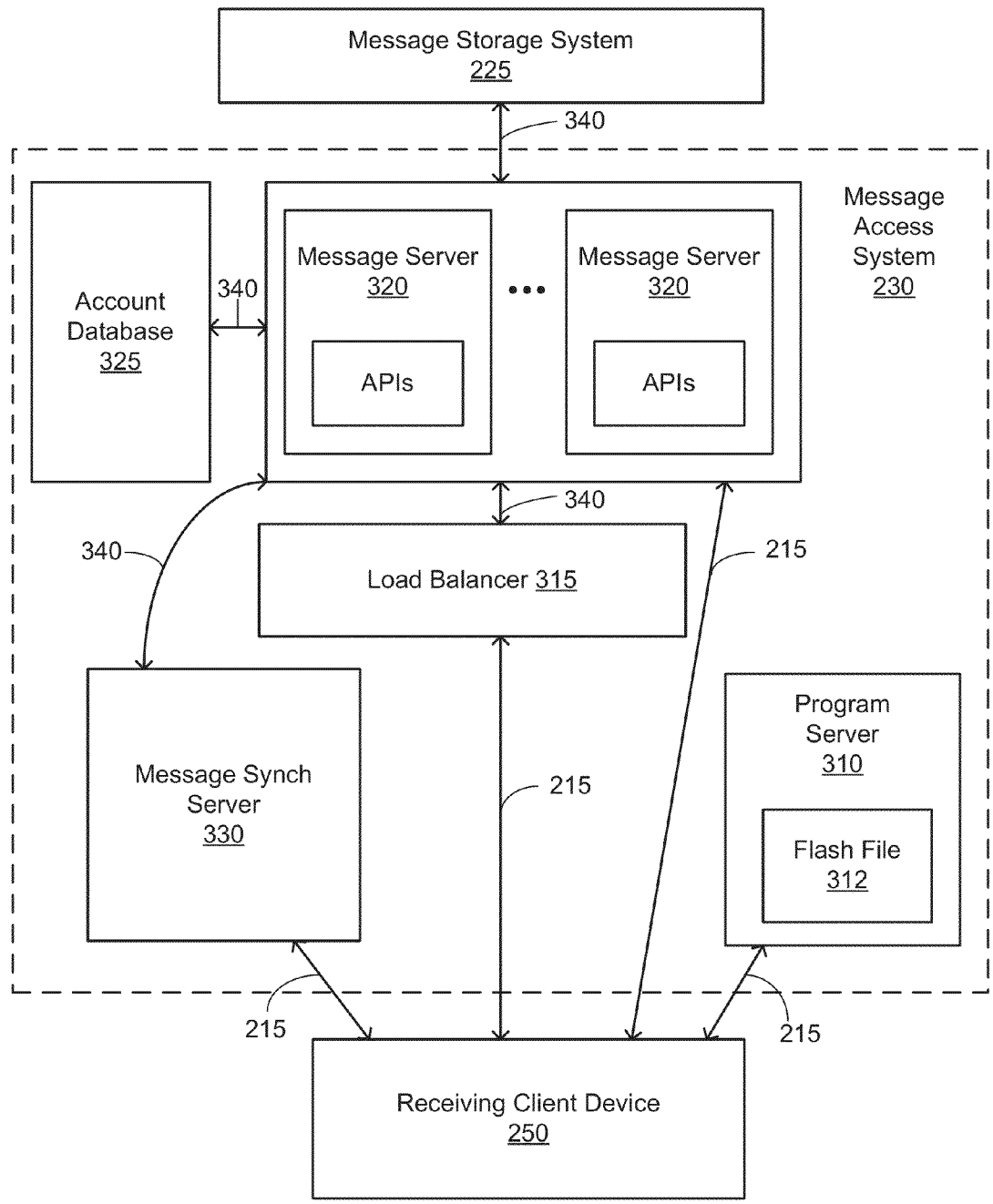
FIG. 3 is a conceptual diagram showing components and interactions of an exemplary message access system in which some embodiments operate.

FIG. 3 is a conceptual diagram showing components and interactions of an exemplary message access system 230 in which some embodiments operate. In some embodiments, the message access system 230 comprises at least one program server 310, at least one load balancer 315, at least one message server 320, at least one account database server 325, and at least one message synchronization server 330. The account database server 325 may comprise a dedicated server or may be integrated with another server, such as a program server 310 or a message server 320.

A receiving client device 250 may be connected to the program server 310, load balancer device 315, message server 320, and message synchronization server 330 through the connection system 215. The various components of the message access system 230 and the message storage system 225 may be interconnected through a computer network 340, such as a point-to-point link, shared local area network (LAN), wide area network (WAN), or virtual private network (VPN) implemented over a public network such as the Internet.

In some embodiments, the message access system 230 comprises two different servers: a program server 310 and a message server 320 having different functions. In other embodiments, the functions of the program server 310 and message server 320 are combined into a single server. Each server may comprise a computer system (having hardware and software) in a network that is shared by multiple users. The program server 310 may store a Flash media UI file (shown as Flash media UI file 312) that is transmitted to a receiving client device 250. Each receiving client device 250 may download/receive and install the Flash media UI file 312 from the program server 310. Once installed, the Flash media UI file 312 may provide a Flash UI engine on the receiving client device 250.

Preferably, the Flash media UI file 312 comprises only Flash® programming instructions. The Flash media UI file 312 may comprise Flash® programming instructions for configuring a message UI and a settings UI, and also comprises a one or more embedded applications for performing various functions when executed, as described herein. Preferably, the Flash media UI file is in the Small Web Format (SWF) format as a .swf file. The Flash UI engine executes the Flash media UI file 312 to perform embodiments herein.

Figure 4:
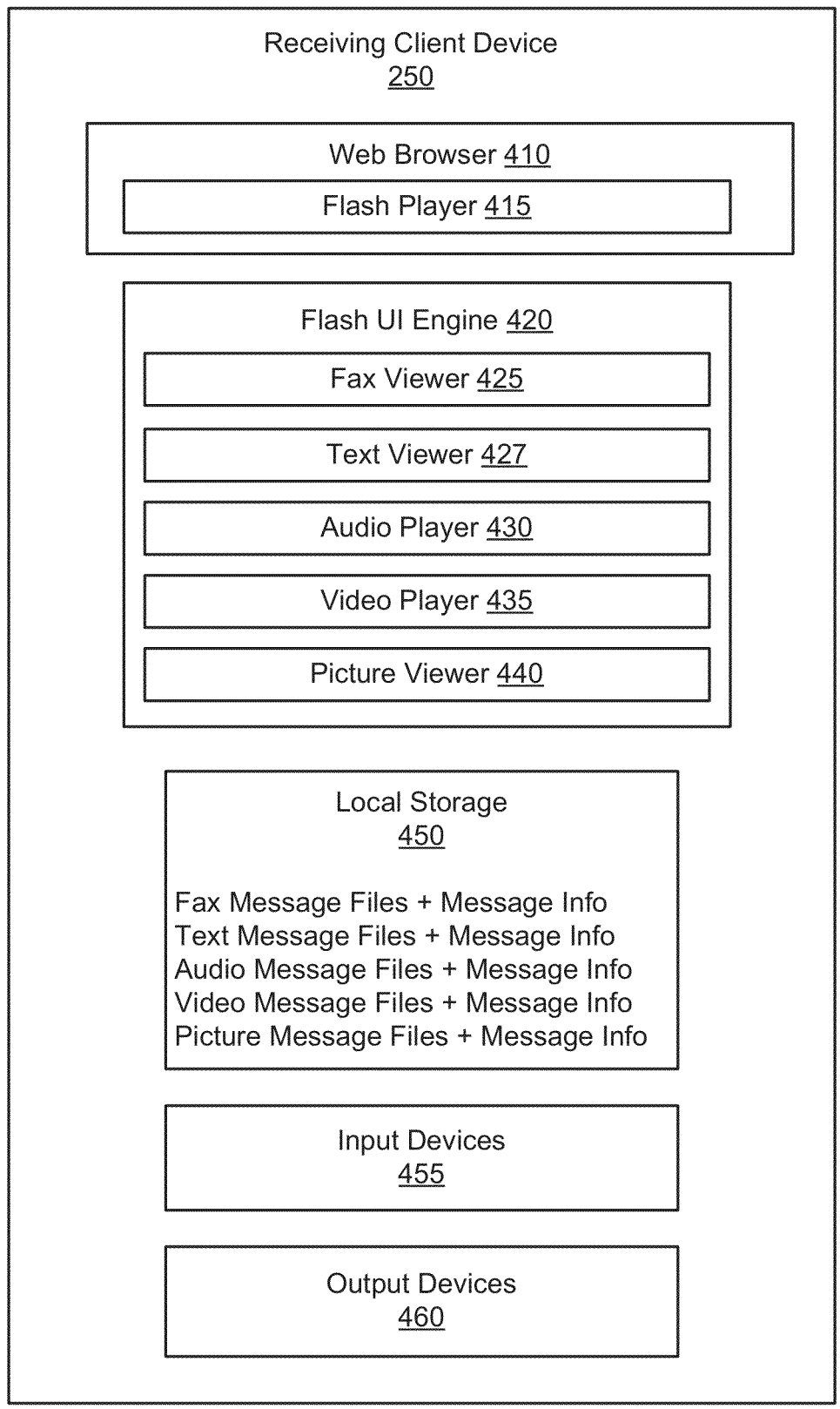
FIG. 4 is a conceptual diagram showing components of an exemplary receiving client device in which some embodiments operate.

FIG. 4 is a conceptual diagram showing components of an exemplary receiving client device 250 in which some embodiments operate. As shown in FIG. 4, the receiving client device 250 comprises a Flash UI engine 420 and a web browser 410 comprising a Flash player 415. The web browser 410 may comprise a web browser engine having computer hardware configured to perform embodiments herein. The Flash player 415 may comprise a Flash player engine having computer hardware configured to perform embodiments herein. The Flash player 415 may comprise Adobe® Flash® Player provided by Adobe Systems Incorporated. The terms "web browser" and "web browser engine" may be used interchangeably and the terms "Flash player" and "Flash player engine" may be used interchangeably.

The Flash UI engine 420 comprises a message UI engine and a settings UI engine. The message UI engine may be used by a user to access his/her messages through the message service system 220. The settings UI engine may be used by an administrator to access messages of other users of the message service system 220 and to perform various administrative functions, such as changing configuration settings, etc.

As shown in FIG. 4, the Flash UI engine 420 may comprise a plurality of different embedded application engines 425-440 within the Flash UI 420 for presenting (e.g., displaying or playing back) a plurality of different message file types in a plurality of different format types. Each embedded application 425-440 may be configured for decoding and presenting one or more particular message file types in one or more different formats. In the example of FIG. 4, the embedded applications include (and thus the Flash UI Engine 420 includes) a fax viewer 425 for viewing fax messages, a text viewer 427 for viewing text messages, an audio player 430 for playing back voice/audio messages, a video player 435 for playing back video messages, and a picture viewer 440 for viewing picture messages. The embedded applications may also include converters, such as converters for converting an audio file encoded in an .MP3 format to a WAV format or for embedding an audio file into a SWF file. This allows data to transmitted to the Flash UI engine in one format that is, for example, more suitable for bandwidth-sensitive communication (e.g., MP3, which comprises compressed audio data), and converted in a different format that is more suitable for playback or display (e.g., WAV, which comprises uncompressed audio data).

In some embodiments, each embedded application 425-440 may be configured for decoding and presenting one or more particular message file types in a plurality of different formats. For example, the audio player 430 may be configured for playing back voice/audio messages in a plurality of different formats (e.g., MP3, AIFF, WAV, etc.). In other embodiments, the Flash UI 420 may include different embedded applications for different format types of the same message type. For example, the Flash UI 420 may include a first embedded application for audio messages in a first format and a second embedded application for audio messages in a second format. As such, the Flash UI 420 leverages the multimedia capabilities of Flash programs.

As shown in FIG. 4, the receiving client device 250 also comprises a local storage device 450 (such as a disk device, solid state device, etc.). In some embodiments, message files and associated message information may be downloaded and stored to the local storage 450. In the example shown in FIG. 4, the local storage device 450 may store fax message files, text message files, voice/audio message files, video message files, and picture message files and the message information associated with each message file. As known in the art, Flash programs also provide strong support and capabilities for local storing and caching of data. In some embodiments, the Flash UI 420 leverages this local caching support by downloading and storing all current messages for an intended recipient (user) to the local storage device 450 on the receiving client device 250. A local storing method 800 is discussed below in relation to FIG. 8.

As shown in FIG. 4, the receiving client device 250 also comprises input device 455 for providing user input and output devices 460 for presenting the messages. The input devices 455 may be of any type that allows an end user to provide input into a computer system. The input devices 455, such as a keyboard, mouse, trackball, touch-sensitive screen, etc., allow a user to provide user input and selections and interact with the Flash UI 420. The output devices 460 may be of any type generally used by a computer system to provide information to an end user. The output devices 445 may include, for example, a display (e.g., television, monitor, etc.) and audio devices (e.g., headphone jack, speakers, etc.).

Each receiving client device 250 may further comprise various computer hardware components configured for implementing embodiments described herein. For example, a receiving client device 250 may comprise a computing device 1100 or a mobile computing device 1150 shown in FIG. 11. The receiving client device 250 may include the various computer hardware components (e.g., processor 1102, memory 1104, storage device 1106) of the computing devices 1100 or 1150 that are configured for implementing embodiments described herein. These computer hardware components are described in relation to FIG. 11 and are not discussed in detail here.

B. Connection with Message Server and Homepage User Interface

After the Flash media UI file 312 is installed, the receiving client device 250 connects with a message server 320 of the message access system 230. This may be performed, for example, by the receiving client device 250 sending a connection request to the message access system 230 (by using the web browser 410 to submit a web address associated with the message access system 230). The connection request may be received by a load balancer 315 of the message access system 230. The load balancer 315 may be configured to receive and distribute connection requests from receiving client devices 250 to the message servers 320 for processing. For example, the load balancer 315 may be configured to receive and route connection requests in rotating sequence to the message servers 320 to evenly distribute connection requests among the plurality of message servers 320. Using the load balancer 315 and the plurality of message servers 320 in this manner also provides message server redundancy to avoid a single point of failure in the message access system 230. After a message server 320 receives the connection request, the receiving client device 250 may be directly connected with the message server 320 through the connection system 215.

The message server 320 then processes the connection request by sending a login page to the receiving client device for requesting login information. Login information may comprise, for example, a user identifier (e.g., username and/or phone number) and password. The receiving client device 250 sends the login information and the message server 320 may verify the login information. The login information for a plurality of users may be stored to the account database 325. After the message server 320 verifies the login information on the account database 325, the message server 320 may send the receiving client device 250 a homepage UI which is displayed on a display (e.g., monitor or screen) of the receiving client device 250.

The homepage UI may be formatted using a markup language (e.g., HTML, XML) or a non-markup language. The homepage UI does not display any message information. The homepage UI may display a plurality of selectable icons, each icon for selecting and executing a particular UI having particular functions. The homepage UI comprises a "message" icon for selecting and executing the message UI and/or a "settings" icon for selecting and executing the settings UI.

C. Components for Accessing Messages with Flash User Interface

The homepage UI may receive a user selection (through an input device such as a mouse, trackball, keyboard, etc.) of the "message" icon on the homepage UI. If so, the receiving client device 250 executes the message UI (Flash UI 420). In some embodiments, the receiving client device 250 displays the message UI as a separate pop-up window that overlays the homepage UI. In other embodiments, the receiving client device 250 displays the message UI as a separate pop-up window from the window that displays the homepage UI. If a pop-up window is used, closing the message UI closes the pop-up window so the homepage UI is visible again. In other embodiments, the receiving client device 250 replaces the homepage UI with the message UI. The may return to the homepage UI by, for example, clicking on navigation links at the top of the window.

Upon the message icon being selected, the message UI automatically requests and displays a message list comprising a list of all, or selected subset of, current messages of the user. The message list may comprise message information for all current messages of the user (as identified by the user identifier in the login information). Current messages may comprise new messages not yet displayed to the user as well as messages previously displayed but not yet deleted by the user. The message UI may send a request for the message list to the message server 320. In turn, the message server 320 may retrieve the message list for the user from the account database 325. The message server 320 may comprise application programming interfaces (APIs) configured for interacting with the account database 325 for retrieving message information from the account database 325.

Figure 5:
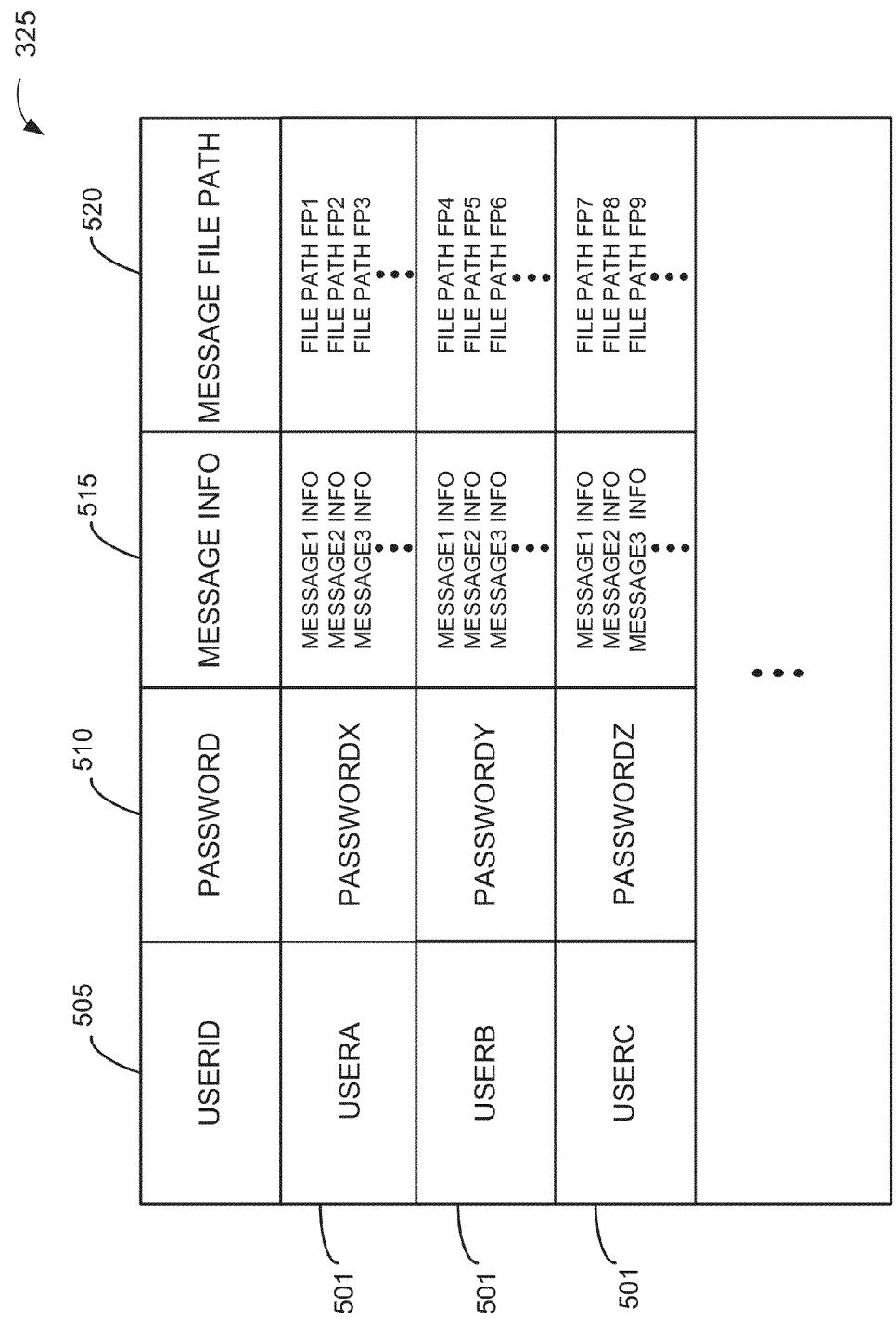
FIG. 5 shows a conceptual diagram of an exemplary account database.

The account database 325 stores message information for all current messages for a plurality of users. FIG. 5 shows a conceptual diagram of an exemplary account database 325. As shown in the example of FIG. 5, the account database 325 may comprise a plurality of entries 501, each entry 501 having a plurality of data fields 505-520. The account database 325 may comprise an entry 501 for each current user/subscriber of the message service system 220. The data fields may include a user identifier (e.g., username and/or phone number), password 510, message information 515, and message filepath 520. The field for message information 515 may comprise message information for each current message corresponding to the user identifier. The field for message filepath 520 may comprise a filepath for each current message, the filepath being used to retrieve the current message that is stored on the message storage system 225.

As described above, the message storage system 225 stores message files and message information associated with each message file. The account database 325 may periodically synchronize with the message storage system 225 to update the data in the account database 325. In this manner, the account database 325 may contain up-to-date message information and filepaths for current messages for each user. Note that message information for each stored message comprises various information including a user identifier for the intended recipient (e.g., username and/or phone number). The user identifier in the message information may be used to determine which entry 501 in the account database 325 to store the message information by matching the user identifier in the message information with the user identifier in the entry 501.

After the message server 320 retrieves the message list (comprising message information for all, or a subset of, current message for the user) from the account database 325, the message server 320 sends the message list to the receiving client device 250 via the connection system 215. The message UI on the receiving client device 250 then displays the message list on an "inbox" page. The message UI may display the message information for all current messages by displaying for each current message, for example, an identifier for the sending client device (e.g., the phone number of a caller who left a voicemail), the message type, the date and time the message was received, etc. The message UI may also display a selectable "presentation" icon corresponding to each current message that may be selected for presenting (e.g., viewing or playing back) the current message.

The message UI may then receive, from the user, a selection of a presentation icon for a particular message. This requires the message UI to receive the message file itself (e.g., an MP3 file for a voicemail), or data derived from the message file through a conversion process that is suitable for transmission to and presentation in the message UI (e.g., an MP3 file that was generated from a WAV file containing the voicemail through a WAV-to-MP3 converter, or a SWF file in which the audio data is embedded). In response, the message UI sends the message server 320 a request for the message file corresponding to the selected message. The message server 320 may retrieve the filepath for the selected message from the account database 325 and use the filepath to retrieve the selected message file from the message storage system 225. The message server 320 may comprise application programming interfaces (APIs) configured for interacting with the message storage system 225 for retrieving message files from the message storage system 225.

As known in the art, a filepath may represent a route to a file on a storage device that may be mapped to a physical address location on the storage device where the file is stored. In some embodiments, the message server 320 maps the filepath to the physical address location of the message file. In other embodiments, the message storage system 225 maps the filepath to the physical address location of the message file. Filepath mapping and alternative embodiments for the message storage system 225 are discussed below in relation to FIG. 9.

In some embodiments, the message server 320 may convert the requested message file into a different format suitable for transmission to and presentation in the message UI. In some embodiments, the message server 320 may convert a requested message file that is encoded in WAV format to MP3 format to reduce the amount of network resources required to transmit the file. In other embodiments, the message server 320 may convert a requested message file that is encoded in MP3 format to WAV format to reduce the computing resources required for playback in the receiving client device 250. In other embodiments, the message server 320 may convert a requested message file that is encoded in MP3 format into a SWF file that contains the audio data in MP3 format for easier playback on the client device 250. For the sake of simplicity, the following discussion will refer only to the transmission of the message file itself. Those skilled in the art will recognize, however, that some embodiments may instead transmit data generated as part of a conversion process.

After retrieving the requested message file, the message server 320 sends the requested message file to the receiving client device 250 which then presents the requested message file. To present the message file, the message UI may select and execute an embedded application appropriate for the message and format type of the message file. For example, if the message file is an audio message file in a first format, the message UI may select and execute an embedded application that is configured for playing audio files in the first format. In some embodiments, after receiving the requested message file, the receiving client device 250 stores the requested message file to its local storage 450 and then presents the message file from the local storage 450. In other embodiments, after receiving the requested message file, the receiving client device 250 may convert the message file into a different format suitable for presentation by a particular embedded application. For example, the message UI may convert a received message file encoded in MP3 into WAV format and pass this converted data to an embedded application appropriate for playing WAV files. Such a design would require only a small number of embedded applications capable of presenting messages in a user-friendly manner (e.g., allowing forward, reverse, rewind, and volume control, and providing an intuitive embedded application UI); any file formats could be presented through this small set of embedded applications so long as an appropriate converter is available.

To present the selected message file, the message UI may provide and display an embedded application UI for the embedded application. In some embodiments, the message UI may provide a different embedded application UI for each embedded application. Each embedded application UI may comprise different features and selectable icons depending on the embedded application. For example, the message UI may provide an audio UI for an audio player, the audio UI having a selectable playback button, playback control buttons (e.g., fast forward and rewind), and a volume control. In some embodiments, an embedded application UI may be integrated in the same window as the message UI (where the message information for one or more messages is also displayed). Integrated embedded application UIs may be provided for commonly used embedded applications. A non-integrated embedded application UIs may be provided for not commonly used embedded applications.

In addition to presenting messages, the message UI may also provide other selectable icons for other message functions, such as message forwarding, message deleting, marking the message as read or unread, blocking the sender, calling the sender, sending a fax to the sender, etc. Upon receiving a user selection of a message function, the message UI executes the message function in response. These additional message functions may also be provided by embedded applications configured for performing the message functions. For example, an embedded application may comprise a softphone application for calling back a sender. These additional message functions are discussed below in Section IV.

The user may interact with the message UI by selecting the various message functions and then select to close the message UI. Upon receiving a selection to close the message UI, the separate pop-up window of the message UI closes and the underlying homepage UI is displayed. The homepage UI may receive a user selection of the "settings" icon on the homepage UI. If so, the receiving client device 250 executes the settings UI. In some embodiments, the receiving client device 250 displays the settings UI as a separate pop-up window that overlays the homepage UI.

The settings UI may be used by an administrator to access messages of other users through the message access system 230 and to perform various administrative functions, such as changing configuration settings, etc. The settings UI may provide message lists and message files of other users utilizing the devices and methods described herein. The settings UI is described further below in Section IV. An administrator user may interact with the settings UI to perform various administrative functions and then select to close the settings UI. Upon receiving a selection to close the settings UI, the separate pop-up window of the settings UI closes and the underlying homepage UI is displayed.

In some embodiments, the message access system 230 further comprises a message synchronization server 330 for synchronizing messages and message information between the receiving client device 250 and the message service system 220. Message synchronization may be needed, for example, when a user of a receiving client device 250 receives, deletes, or reads messages, and the message service system 220 needs to be updated to reflect these message changes. The receiving client device 250 may interact with the message synchronization server 330 which may interact with a message server 320 to synchronize messages and message information for the user of the receiving client device 250. In some embodiments, a message synchronization method described in U.S. Pat. No. 7,702,669 (issued on Apr. 20, 2010, entitled "Synchronization in Unified Messaging Systems") is used. In other embodiments, other message synchronization methods known in the art may be used.

D. Non-Markup Language and Non-HTTP Embodiments

The Flash media UI file 312 comprises an interpretable file (a file able to be interpreted) having only interpretable program instructions (instructions able to be interpreted), preferably Flash® program instructions. The Flash UI engine may include a computer processor that executes the Flash media UI file 312 to perform embodiments herein, wherein the Flash UI engine is compatible with a Flash® Player (from Adobe Systems Incorporated). The Flash media UI file 312 may comprise programming instructions for a message UI, a settings UI, and a plurality of embedded applications for performing various functions described herein. Preferably, the Flash media UI file is in the Small Web Format (SWF) format as a .swf file. The receiving client device provides a web browser having the Adobe® Flash® Player and the Flash media UI file as a Flash plug-in program. The Flash media UI file 312 does not comprise any markup language; that is, the Flash media UI file comprises a file format other than markup language format. Preferably, the Flash media UI file comprises only Flash® programming instructions.

The message information may also be formatted in a non-markup language when stored in the message storage system 225, the account database 325, and the receiving client device 250. The message information may also be transmitted in a non-markup language between the various components in accordance with embodiments herein. For example, the message information may be transmitted in a non-markup language between the message storage system 225, account database 325, message server 320, and the receiving client device 250. In some embodiments, the message information is stored and transmitted in comma-delimited format or in another type of non-markup language format.

As known in the art, a markup language is a text-encoding system that uses a set of markup tags to annotate text within a text document. Examples of markup languages include hyper-text mark-up language (HTML) and extensible markup language (XML). As known in the art, comma-delimited format is an example of a non-markup language format and may also be referred to as comma separated values (CSV). Comma-delimited format may comprise a data format whereby each piece of information is separated by a comma. For example, message information for a message file may be formatted as: a size of the message, sender phone number, sender name, message type, date and time message received. As known in the art, comma-delimited format is widely used and supported as most database systems and other data-intensive applications, such as spreadsheet applications, are able to import and export comma-delimited information.

Preferably, message data is transmitted between the various components using a non-HyperText Transfer Protocol (non-HTTP). For example, the message data may be transmitted in a non-HTTP protocol between the message storage system 225, account database 325, message server 320, and the receiving client device 250. In these embodiments, the message data may be transmitted using a custom protocol (i.e., a protocol proprietary to this system) or standard protocol (e.g., File Transfer Protocol (FTP) or WebSocket) that is a non-HTTP protocol. In further embodiments, the Flash media UI file 312 stored on the program server 310 is transmitted to the receiving client device 250 using a non-HTTP protocol, such as a custom protocol or standard protocol (e.g., FTP or WebSocket) that is a non-HTTP protocol.

As known in the art, FTP comprises a network protocol for transferring files from one computer device to another computer device over a TCP/IP-based network, such as the Internet. FTP may be used to transfer any variety of file types. As known in the art, WebSocket comprises a network protocol for providing bi-directional, full-duplex communications channels, over a single Transmission Control Protocol (TCP) socket. WebSocket may be implemented in any client or server application, including web browsers and web servers.

E. Method for Accessing Messages on Message Service System

Figure 6:
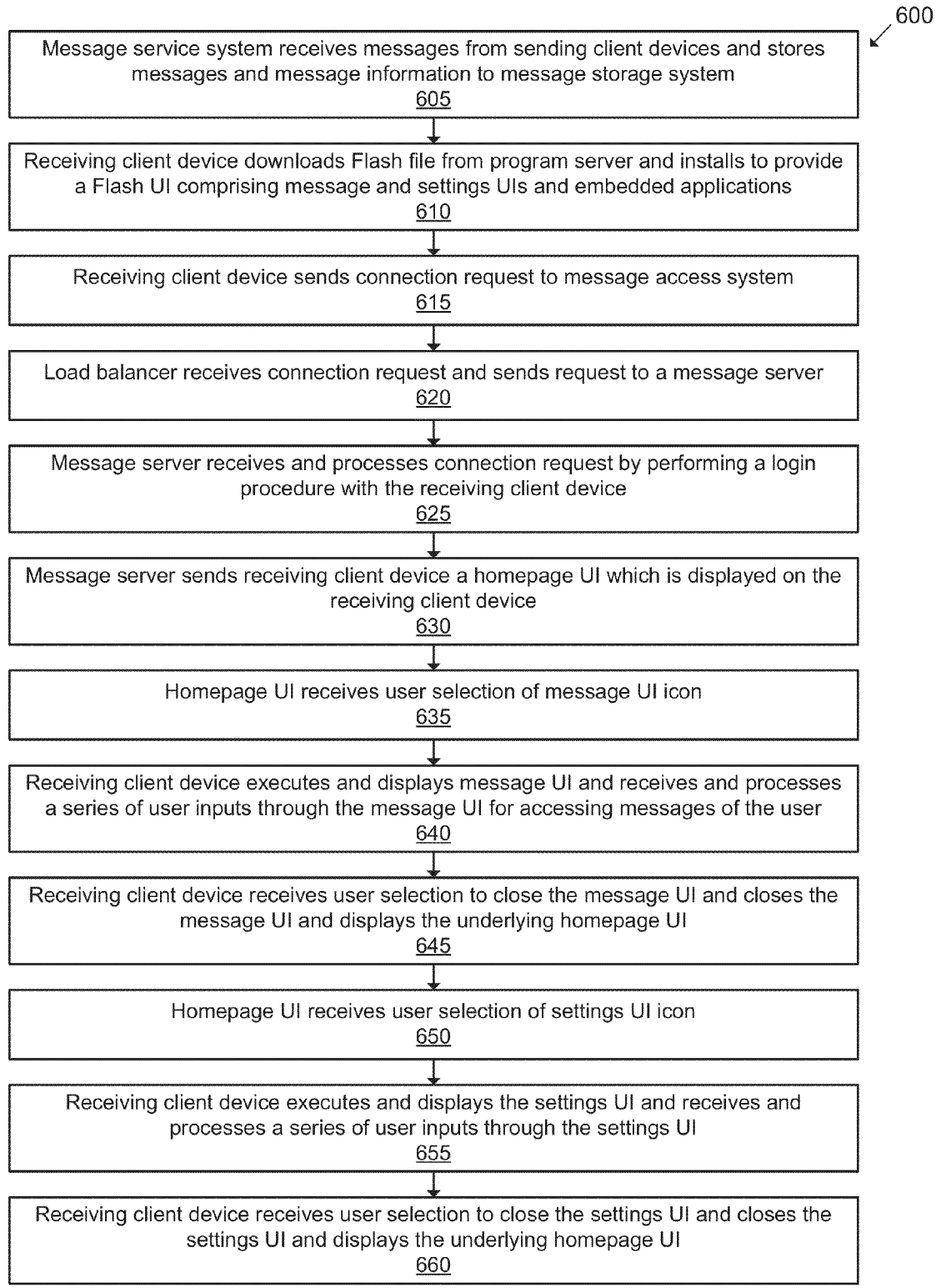
FIG. 6 shows a flowchart of an overall method for accessing messages on a message service system.

FIG. 6 shows a flowchart of an overall method 600 for accessing messages on a message service system 220. The method 600 is described in relation to FIGS. 2, 3, 4, and 5 which conceptually illustrate the steps of the method 600. The order and number of steps of the method 600 are for illustrative purposes only to demonstrate various operations that may be performed. In other embodiments, however, a different order and/or number of steps may be used.

The method 600 begins by the message service system 220 receiving (at 605) messages from sending client devices 205 through the connection system 215 and storing the messages and message information for each message to the message storage system 225. The stored messages may comprise message files of a plurality of different message types in a plurality of different format types. The message information for a message may also be stored with the message.

The receiving client device 250 downloads (at 610) the Flash media UI file 312 from the program server 310 and installs the Flash media UI file 312 to provide a Flash UI engine on the receiving client device 250. The Flash UI engine 420 may comprise a message UI engine and a settings UI engine and comprise a plurality of embedded application engines for presenting a plurality of different message and format types.

The receiving client device 250 then sends (at 615) a connection request to the message access system 230. The load balancer 315 of the message access system 230 receives (at 620) the connection request and sends the request to one of the message servers 320. The message server 320 receives and processes (at 625) the connection request by performing a login procedure with the receiving client device by receiving login information from the receiving client device. The message server 320 may verify the login information using the account database 325 that stores login information for current users/subscribers of the message service system 220.

After the login procedure, the message server 320 may send (at 630) the receiving client device 250 a homepage UI which is displayed on the receiving client device 250. The homepage UI may display a "message" icon for selecting and executing the message UI and a "settings" icon for selecting and executing the settings UI.

On the receiving client device 250, the homepage UI may receive (at 635) a user selection of the "message" icon. In response, the receiving client device 250 may execute and display (at 640) the message UI and receive and process a series of user inputs through the message UI for accessing messages of the user. A method 700 for providing a message UI for accessing messages is described below in relation to FIG. 7. An alternative method 800 for providing a message UI for accessing messages by using local caching is described below in relation to FIG. 8. The receiving client device 250 may receive (at 645) a user selection to close the message UI and then closes the message UI and displays the underlying homepage UI.

On the receiving client device 250, the homepage UI may receive (at 650) a user selection of the "settings" icon. In response, the receiving client device 250 may execute and display (at 655) the settings UI and receive and process a series of user inputs through the settings UI for allowing an administrator user to access messages of other users and perform various administrative functions. The settings UI is described further below in Section IV. The receiving client device 250 may receive (at 660) a user selection to close the settings UI and then closes the settings UI and displays the underlying homepage UI.

F. Method for Accessing Messages with Message UI

Figure 7:
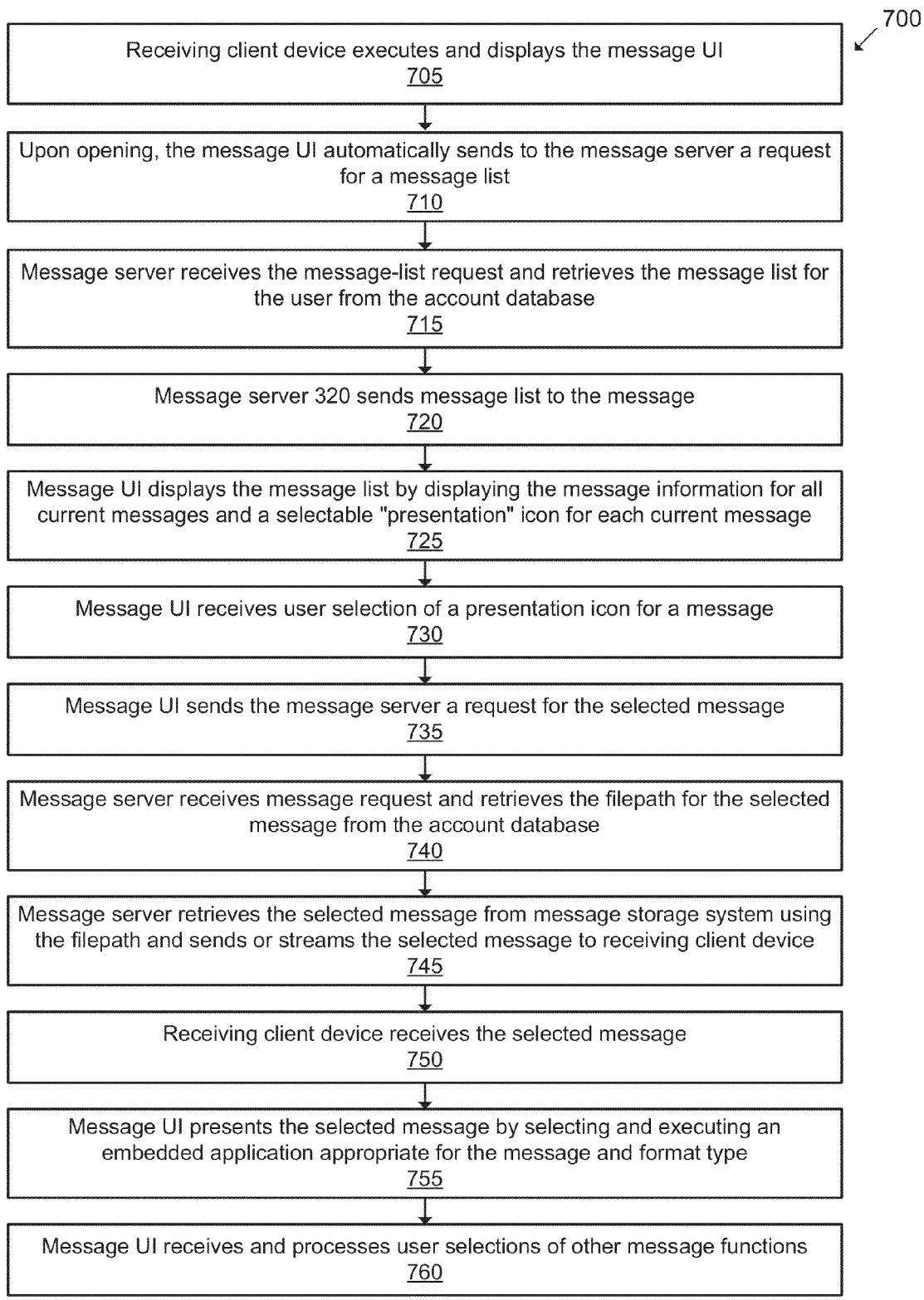
FIG. 7 shows a flowchart of a method for providing a message UI for accessing messages.

FIG. 7 shows a flowchart of a method 700 for providing a message UI for accessing messages. The method 700 is described in relation to FIGS. 2, 3, 4, and 5 which conceptually illustrate the steps of the method 700. The order and number of steps of the method 700 are for illustrative purposes only to demonstrate various operations that may be performed. In other embodiments, however, a different order and/or number of steps may be used. The method 700 may comprise step 640 of the method 600 of FIG. 6.

The method 700 begins by the receiving client device 250 executing and displaying (at 705) the message UI. Upon opening, the message UI automatically sends (at 710) to the message server 320 a request for a message list. The message list may comprise message information for all current messages of the user (as identified by the user identifier in the login information).

The message server 320 receives (at 715) the message-list request and retrieves the message list for the user (as identified by the user identifier) from the account database 325. The message server 320 then sends (at 720) the message list to the message UI on the receiving client device 250. The message UI then displays (at 725) the message list on an "inbox" page. The message UI may display the message information for all current messages as well as a selectable "presentation" icon for each current message for presenting (viewing or playing back) the current message.

The message UI then receives (at 730) a user selection of a presentation icon for a particular message. In response, the message UI sends (at 735) the message server 320 a request for the message file of the selected message. The message server 320 may receive (at 740) the message request and retrieves the filepath for the selected message from the account database 325. The message server 320 then retrieves (at 745) the selected message from the message storage system 225 using the filepath and sends (e.g., streams) the selected message to the receiving client device 250. Optionally, the message server 320 may convert the selected message to a different format prior to sending the selected message to the receiving client device 250.

The receiving client device 250 receives (at 750) the selected message and presents (at 755) the selected message by selecting and executing an embedded application appropriate for the message and format type of the message file. Optionally, the receiving client device 250 may also convert the selected message to a different format suitable for presentation. To present the selected message file, the message UI may provide and display an embedded application UI for the embedded application. In some embodiments, an embedded application UI may be integrated in the same window as the message UI or be displayed in a separate window (e.g., pop-up window) as the message UI.

In some embodiments, e.g., for media messages, the message server 320 may stream (at 745) the selected message to the receiving client device 250. As known in the art, Flash programs provide strong support and capabilities for media streaming. Streaming media may comprise a media message (e.g., audio or video message) that is constantly received and presented by the receiving client device 250 (in steps 750 and 755) while constantly being delivered by the message server 320 (in step 745) until the message stream completes. As used herein, streaming a message indicates receiving of message data that is presented upon being received by the receiving client device 250, while the transmission of the message data by the message server 320 is still continuing. In these embodiments, the message may not be stored to the local storage of the receiving client device 250.

The user may continually select messages for presentation and steps 730 to 755 of the method 700 may be repeated for every message the user selects for presentation. The message UI may also receive (at 760) and process user selections of other message functions, such as message forwarding, message delete, blocking sender, calling sender, etc.

G. Method for Accessing Messages with Message UI Using Local Caching

Figure 8:
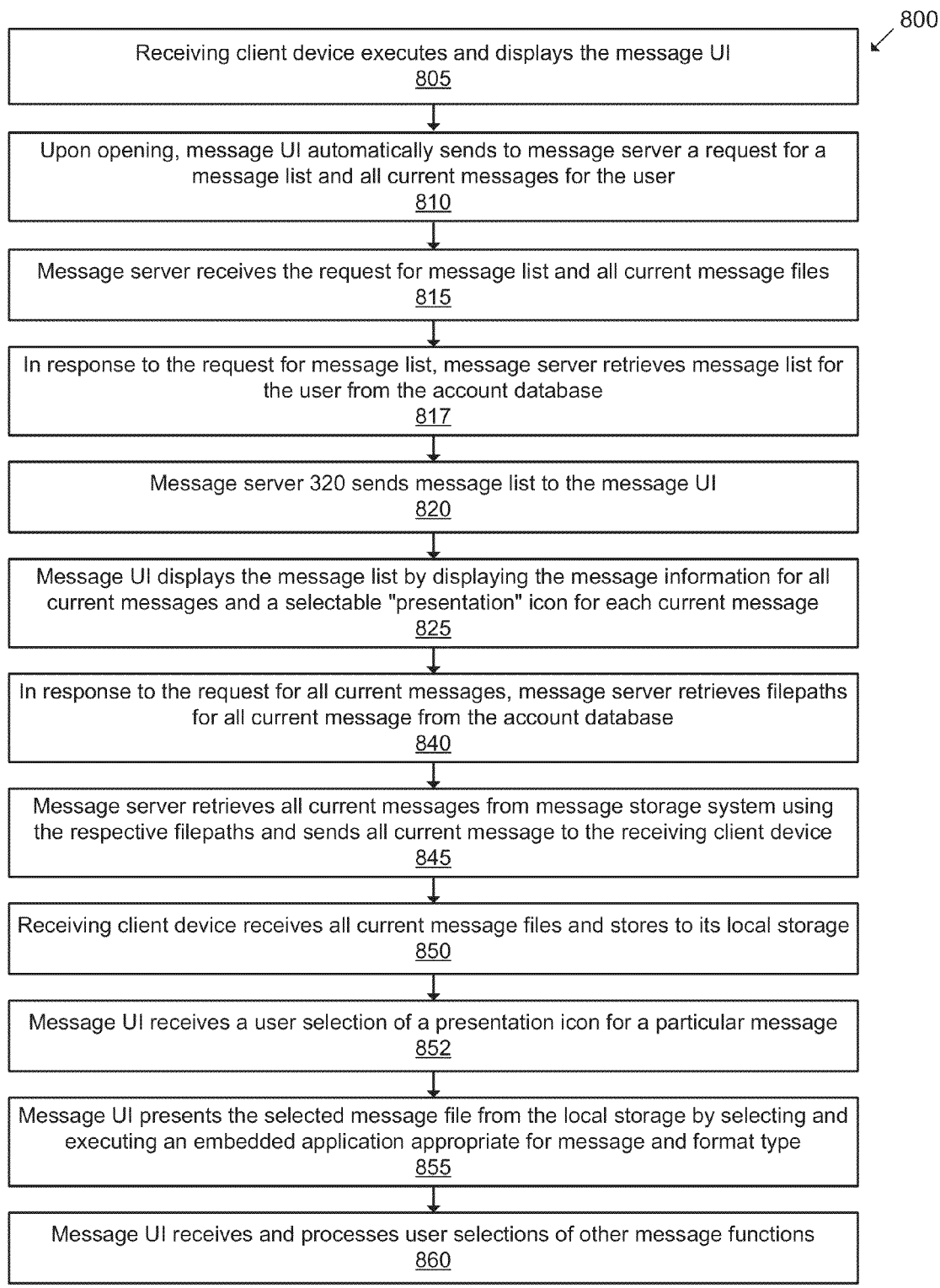
FIG. 8 shows a flowchart of an alternative method for providing a message UI for accessing messages by using local caching.

FIG. 8 shows a flowchart of an alternative method 800 for providing a message UI for accessing messages by using local caching. The method 800 is described in relation to FIGS. 2, 3, 4, and 5 which conceptually illustrate the steps of the method 800. The order and number of steps of the method 800 are for illustrative purposes only to demonstrate various operations that may be performed. In other embodiments, however, a different order and/or number of steps may be used. The method 800 may comprise step 640 of the method 600 of FIG. 6.

The method 800 begins by the receiving client device 250 executing and displaying (at 805) the message UI. Upon opening, the message UI automatically sends (at 810) to the message server 320 a request for a message list and message files for all current messages of the user. In some embodiments, the message UI automatically sends the request for all current messages of the user without human initiation, interaction, or intervention. In these embodiments, the message UI sends the request for all current messages of the user without receiving a selection of a current message from the user.

The message server 320 receives (at 815) the request for the message list and all current message files. In response to the request for the message list, the message server 320 retrieves (at 817) the message list for the user from the account database 325. The message server 320 then sends (at 820) the message list to the message UI on the receiving client device 250. The message UI then displays (at 825) the message list on an "inbox" page. The message UI may display the message information for all current messages as well as a selectable "presentation" icon for each current message for presenting the current message.

In response to the request for all current messages, the message server 320 retrieves (at 840) the filepaths for all current message from the account database 325. The message server 320 then retrieves (at 845) all current messages from the message storage system 225 using the respective filepaths and sends all current message to the receiving client device 250. Note that steps 840 and 845 may be performed concurrently with steps 817 and 820 and a different order of steps may be used. The receiving client device 250 receives (at 850) all the current message files and stores all the current message files to its local storage 450.

The message UI then receives (at 852) a user selection of a presentation icon for a particular message. The message UI presents (at 855) the selected message file by selecting and executing an embedded application appropriate for the message and format type of the message file. The selected embedded application may present the selected message file that is already stored to the local storage 450.

The user may continually select messages for presentation and steps 852 to 855 of the method 800 may be repeated for every message the user selects for presentation. The message UI may also receive (at 860) and process user selections of other message functions.

As shown in FIG. 4, the local storage 450 may store all the current message files for the user, the current message files comprising a plurality of messages of one or more different message types in one or more different format types. The local storage 450 may store at least one current message file without receiving a user selection for presenting the current message. A message file may be stored to the local storage 450 prior to receiving a user selection for presenting the message file. In some embodiments, upon receiving a user selection for presenting a message file, the message UI does not send to the message server 320 a request for the message file and does not receive the message file from the message server 320. In these embodiments, the response of the message UI to the user selection is performed without sending, to the message server 320, a request for the message file and without receiving the message file from the message server 320.

Since all current messages are already stored in the local storage 450, any current message selected for presentation may be retrieved directly from the local storage 450 without requiring separate retrieval from the message service system 220. As such, the message UI may receive and store all current message files at one time while the receiving client device is connected to the message server 320, and then present selected messages from local storage with the receiving client device no longer connected to the message server 320. This may be advantageous if the receiving client device will not have continual access to the Internet to access the message server 320, for example, if the user is boarding a plane or is in a location without Internet access. As such, the message UI may operate independent of whether the client device is able to access the Internet.

H. Alternative Message Storage System

Figure 9:
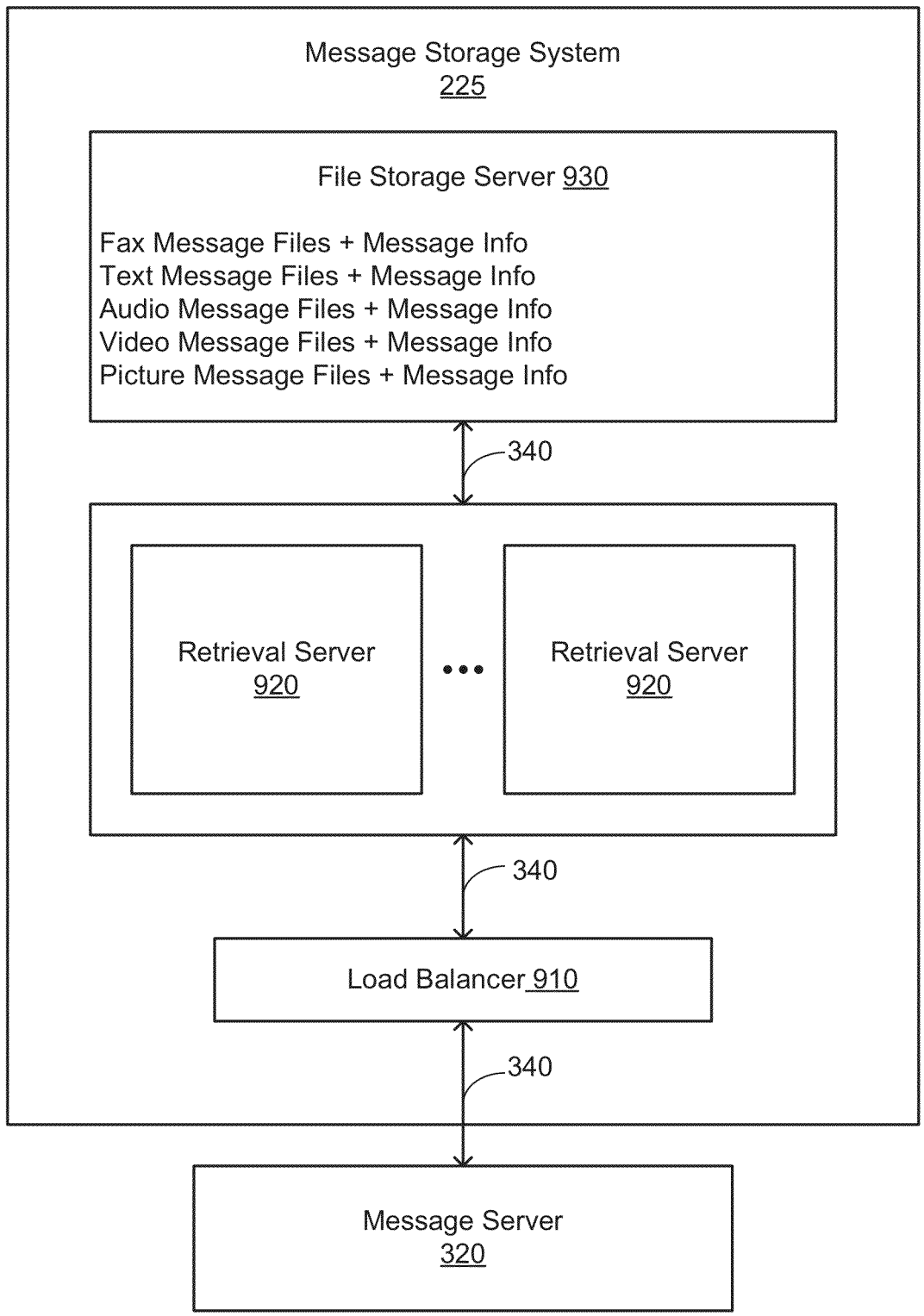
FIG. 9 is a conceptual diagram showing an exemplary message storage system in which some embodiments operate.

As discussed above, the message storage system 225 received messages and message information for each message. FIG. 9 is a conceptual diagram showing an exemplary message storage system 225 in which some embodiments operate. In some embodiments, the message storage system 225 comprises at least one load balancer device 910, at least one retrieval server 920, and at least one file storage server 930 that are interconnected by a computer network 340.

The file storage server 930 may store message files of a plurality of different messages and message information for each message file. The file storage server 930 may comprise a storage system adapted to store and retrieve information/data on a plurality of storage devices (such as disk devices, solid state devices, etc.). The file storage server 930 may comprise a storage operating system that implements a file system to organize logically the information as a hierarchical structure of directories and files on the storage devices.

The load balancer 910 may receive requests for the retrieval of message files from the message servers 320. The load balancer 910 may be configured to receive and distribute message requests to the retrieval servers 920 for processing. For example, the load balancer 910 may be configured to receive and route message requests in rotating sequence to the retrieval servers 920 to evenly distribute message requests among the plurality of retrieval servers 920. Using the load balancer 910 and the plurality of retrieval servers 920 in this manner also provides retrieval server redundancy to avoid a single point of failure in the message storage system 225.

The message request from a message server 320 comprises the filepath of the requested message file. The retrieval server 920 receives the message request and retrieves the requested message file from the file storage server 930 using the filepath. The retrieval server 920 may do so by mapping the filepath to a physical address location on a storage device of the file storage server 930 where the message file is stored. After retrieving the requested message file, the retrieval server 920 may send the message file to the message server 320.

In other embodiments, however, the message storage system 225 comprises only the file storage server 930. In these embodiments, the message server 320 retrieves requested message files directly from the file storage server 930. In these embodiments, the message server 320 may map the filepath to the physical address location on a storage device of the file storage server 930 where the message file is stored.

I. Mobile Receiving Client Devices

In the embodiments described herein, a receiving client device 250 may comprise any variety of devices capable of accessing messages. For example, a receiving client device 250 may comprise a computing device 1100 (e.g., notebook computer, desktop computer, server, computing tablet, computing personal accessory, etc.) or a mobile computing device 1150 (e.g., cellular phone 112E, multimode phone 112F, smartphone, etc.) shown in FIG. 11. The receiving client device 250 may include the various computer hardware components illustrated in FIG. 11 (e.g., processor 1102, memory 1104, storage device 1106) of the computing devices 1100 or 1150 that are configured for implementing embodiments described herein. A receiving client device 250 comprising a computing device 1100 or a mobile computing device 1150 may execute the web browser application 410 and the Flash UI 420 for accessing messages on the message service system 220 through the connection system 215 as described herein.

In addition, a mobile computing device 1150 may access messages on the message service system 220 using an appropriate native application (e.g., an iOS application running on an iPad® or iPhone® from Apple® Inc., an Android® application running on an Android-based smartphone, an application running on a Blackberry®, etc.). In some situations, a native application may be needed if the receiving client device 250 does not support Flash programming instructions, such as devices using Apple's iOS operating system (e.g., the iPhone, iPad, and iPod Touch). As known in the art, such native applications as well as softphone applications do not typically use any markup language to define their user interfaces and may be interpreted into binaries in a native format for the applicable device, whereby the binaries define the user interface.

Also, for a receiving client device 250 comprising a mobile computing device 1150, the message service system 220 will "push" (send) notifications of new messages to the receiving client device 250 automatically when any new message is received. As such, notifications of new messages are typically sent immediately to the receiving client device 250 as soon as a new message is received, without requiring the user to login or request notifications from the message service system 220.

Figure 10:
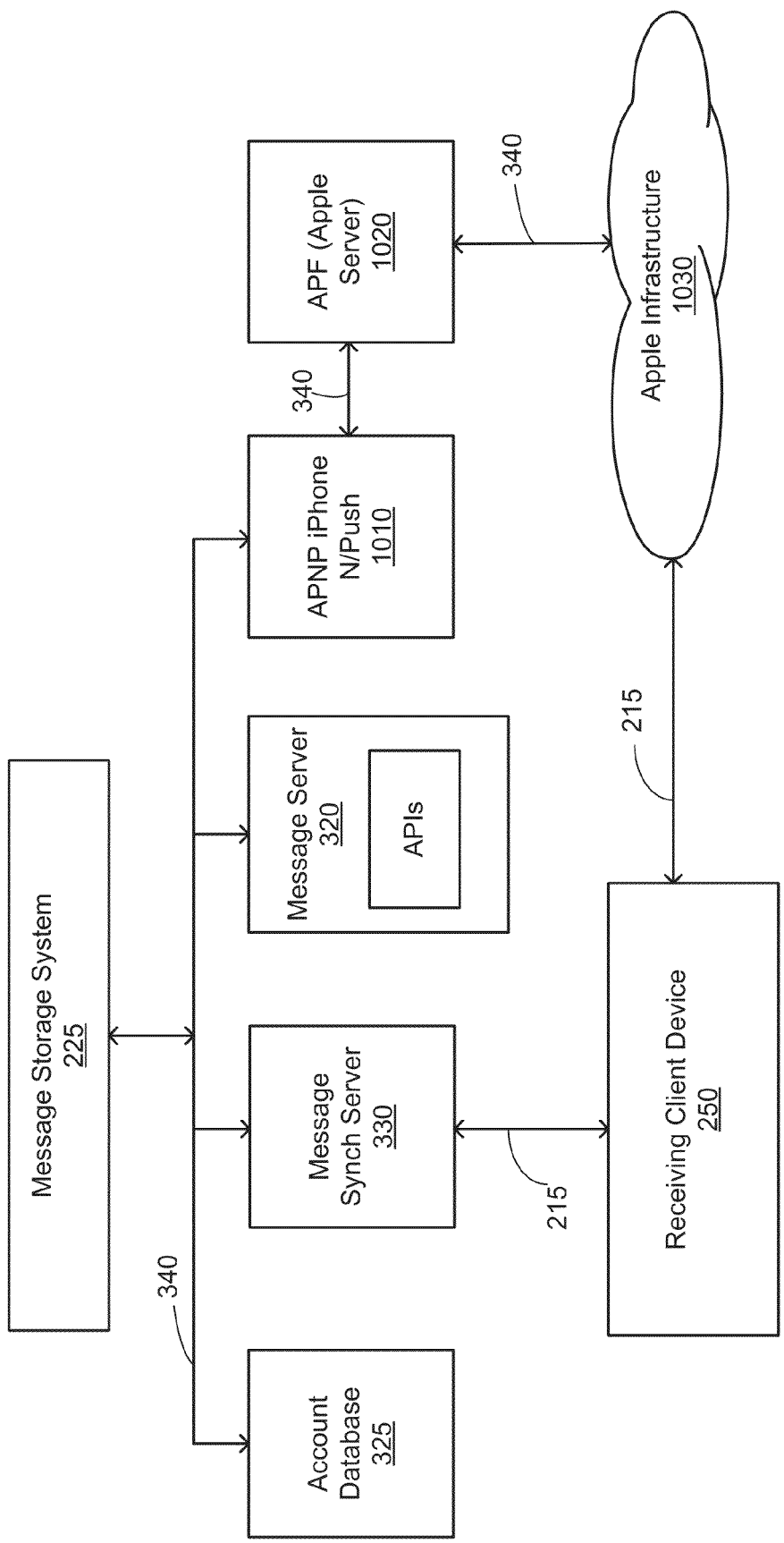
FIG. 10 shows a conceptual diagram of a mobile device environment in which some embodiments operate.

FIG. 10 shows a conceptual diagram of a mobile device environment 1000 in which some embodiments operate. For illustrative purposes, the mobile device environment 1000 comprises components for an Apple device using iOS. In other embodiments, however, other mobile devices may be used. As shown in FIG. 10, the mobile device environment 1000 may comprise a message storage system 225, at least one account database 325, and at least one message synchronization server 330, at least one message server 320, an APNP iPhone N/Push server 1010, an Apple server (APF) 1020, and an Apple infrastructure 1030 interconnected through a computer network 340.

The mobile device environment 1000 also includes a receiving client device 250 connected with the message synchronization server 330 and the Apple infrastructure 1030 through the connection system 215. In some embodiments, the receiving client device 250 comprises a mobile computing device 1150. In other embodiments, however, the receiving client device 250 may comprise a computer device 1100 executing a softphone application. As known in the art, a softphone application may be used for making telephone calls over the Internet using a general purpose computer such as a Windows desktop computer, rather than using special-purpose hardware.

In some embodiments, the receiving client device 250 receives messages and message information through the message synchronization server 330, which retrieves messages and message information from the message server 320. In these embodiments, the receiving client device 250 connects and interacts directly with the message synchronization server 330. The APnP iPhone N/Push server 1010 may send new message notifications for the receiving client device 250 to the Apple infrastructure 1030, which sends the new message notifications to the receiving client device 250.

In some embodiments, the receiving client device 250 receives message information and message notifications from the message synchronization server 330 in a non-markup language, such as comma-delimited format. In some embodiments, messages, message information, and message notifications are transmitted from the message synchronization server 330 to the receiving client device 250 using a non-HyperText Transfer Protocol (non-HTTP) such as a custom protocol.

J. Generic Computing Devices

Figure 11:
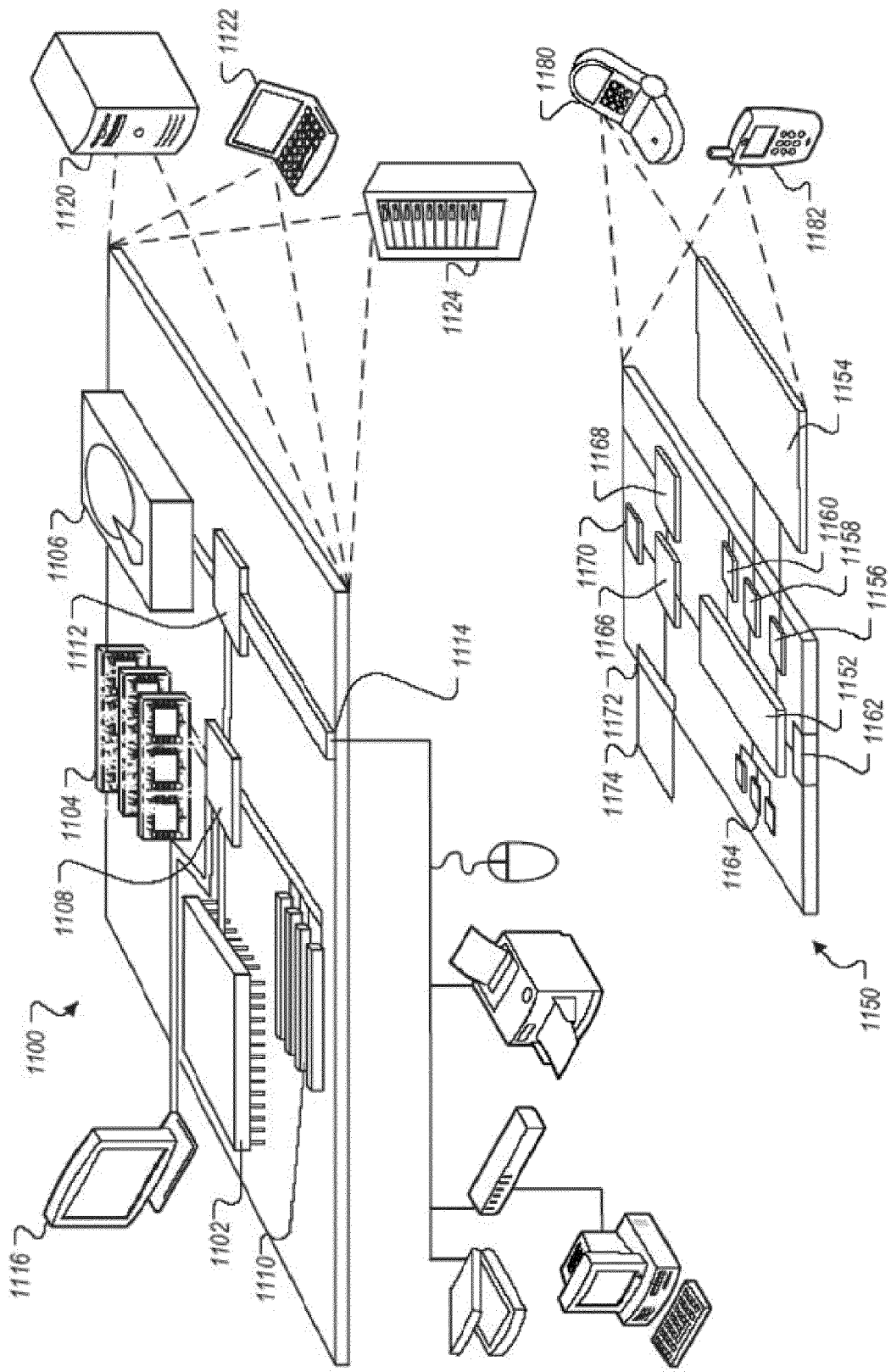
FIG. 11 is a block diagram of computing devices that may be used to implement the systems and methods described herein.

FIG. 11 is a block diagram of computing devices 1100, 1150 that may be used to implement the systems and methods described herein. For example, the computing device 1100 or 1150 may comprise the sending client device 205, receiving client device 250, program server 310, load balancer 315, message server 320, account database 325, message synchronization server 330, devices of the message storage system 225 (such as the load balancer 910, retrieval server 920, file storage server 930), an APNP iPhone N/Push server 1010, Apple server (APF) 1020, or Apple infrastructure 1030.

FIG. 11 is a block diagram of computing devices 1100, 1150 that may be used to implement the systems and methods described in this document, as either a client or as a server or plurality of servers. Computing device 1100 is intended to represent various forms of digital computers, such as laptops, desktops, workstations, personal digital assistants, servers, blade servers, mainframes, and other appropriate computers. Computing device 1150 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a computer-readable medium. In one implementation, the memory 1104 is a volatile memory unit or units. In another implementation, the memory 1104 is a non-volatile memory unit or units.

The storage device 1106 is capable of providing mass storage for the computing device 1100. In one implementation, the storage device 1106 is a computer-readable medium. In various different implementations, the storage device 1106 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1104, the storage device 1106, or memory on processor 1102.

The high speed controller 1108 manages bandwidth-intensive operations for the computing device 1100, while the low speed controller 1112 manages lower bandwidth-intensive operations. Such allocation of duties is exemplary only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can process instructions for execution within the computing device 1150, including instructions stored in the memory 1164. The processor may also include separate analog and digital processors. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT LCD display or an OLED display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provide in communication with processor 1152, so as to enable near area communication of device 1150 with other devices. External interface 1162 may provide, for example, for wired communication (e.g., via a docking procedure) or for wireless communication (e.g., via Bluetooth or other such technologies).

The memory 1164 stores information within the computing device 1150. In one implementation, the memory 1164 is a computer-readable medium. In one implementation, the memory 1164 is a volatile memory unit or units. In another implementation, the memory 1164 is a non-volatile memory unit or units. Expansion memory 1174 may also be provided and connected to device 1150 through expansion interface 1172, which may include, for example, a SIMM card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provide as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, WiFi, or other such transceiver (not shown). In addition, GPS receiver module 1170 may provide additional wireless data to device 1150, which may be used as appropriate by applications running on device 1150.

Device 1150 may also communication audibly using audio codec 1160, which may receive spoken information from a user and convert it to usable digital information. Audio codex 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smartphone 1182, personal digital assistant, or other similar mobile device.

IV. SCREEN SHOTS AND FUNCTIONS OF THE FLASH UI

A. Screen Shot and Functions of the Homepage UI

Figure 12:
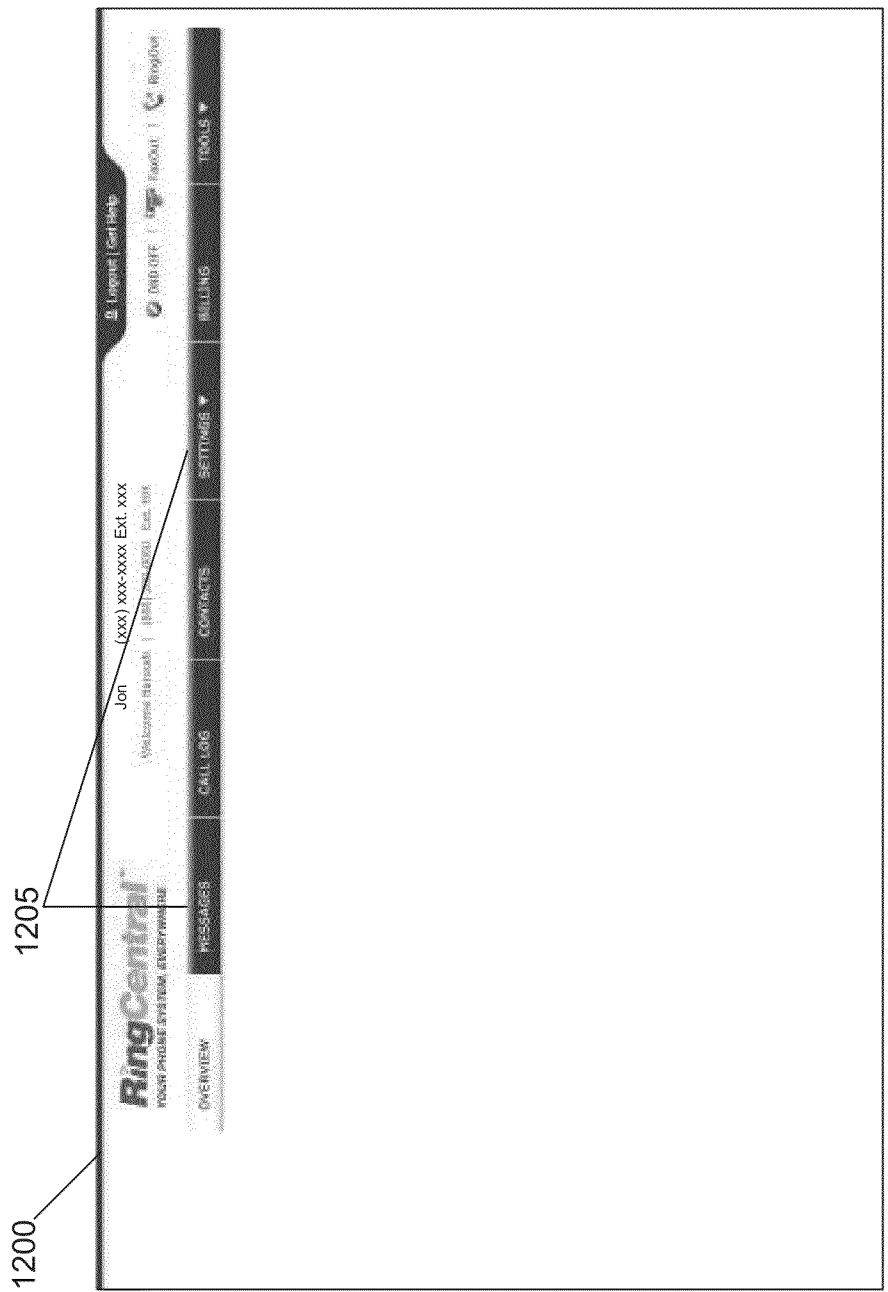
FIG. 12 shows an exemplary screen page of a homepage UI in accordance with some embodiments.

As described above, the message server 320 may send the receiving client device 250 a homepage UI which is displayed on the receiving client device 250. FIG. 12 shows an exemplary screen page of a homepage UI 1200 in accordance with some embodiments. The homepage UI may be formatted using a markup language (e.g., HTML, XML) or a non-markup language. The homepage UI does not display any message information. The homepage UI may display a plurality of selectable icons 1205, each icon for selecting and executing a particular UI having particular functions. In some embodiments, the homepage UI comprises a "message" icon 205 for selecting and executing the message UI and a "settings" icon 1205 for selecting and executing the settings UI.

B. Screen Shots and Functions of the Message UI

Figure 13A:
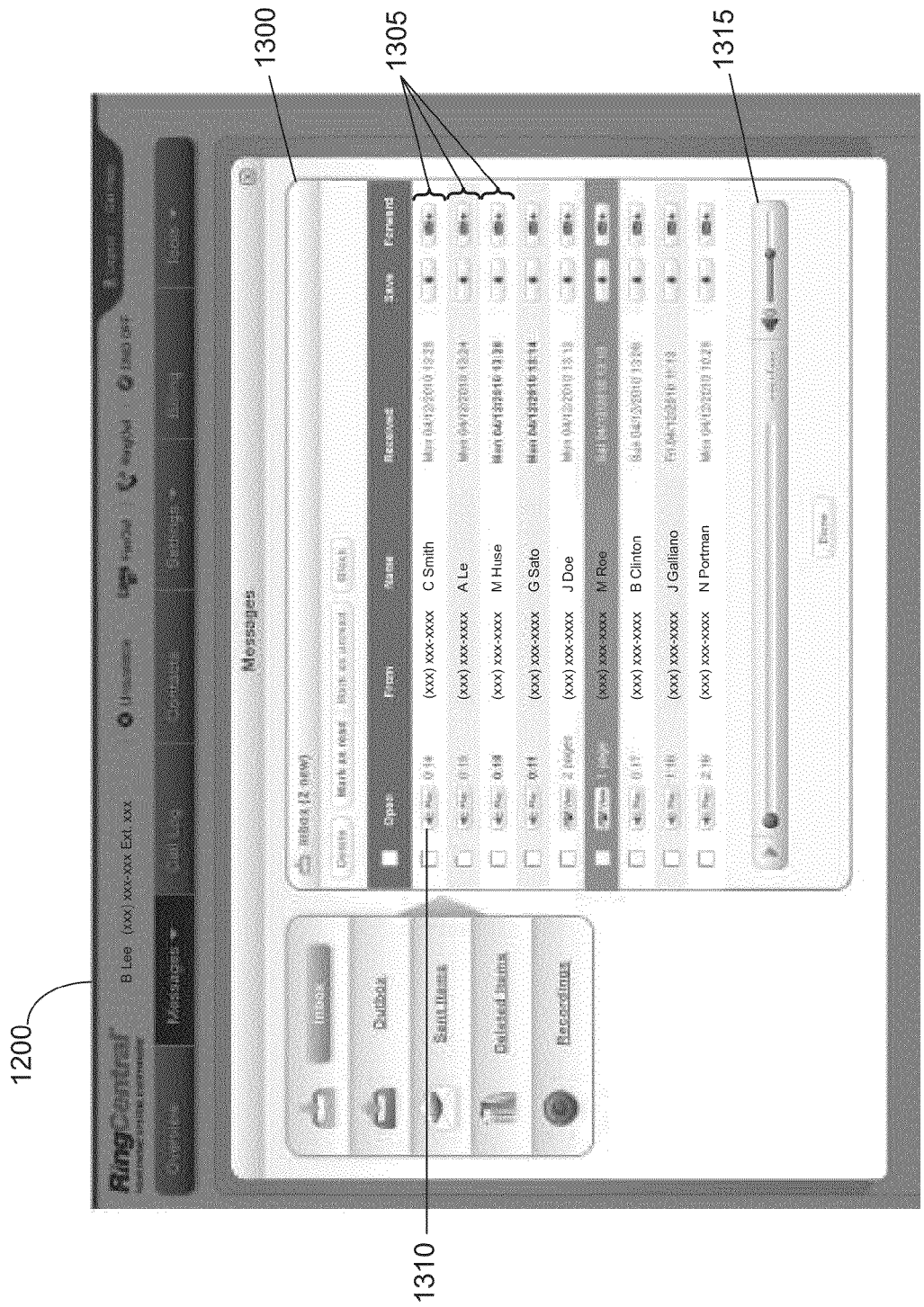
FIGS. 13A-E show exemplary screen pages of a message UI in accordance with some embodiments.

If the homepage UI receives a user selection of the "message" icon on the homepage UI, the receiving client device 250 executes the message UI. FIGS. 13A-E show exemplary screen pages of a message UI 1300 in accordance with some embodiments. As shown in FIG. 13A, in some embodiments, the receiving client device 250 may display the message UI 1300 as a separate pop-up window that overlays the homepage UI 1200.

As shown in FIG. 13A, the message UI 1300 may display message information 1305 for all current messages in list form on an "inbox" page. For each current message, the message information 1305 may include, for example, a size of the message (e.g., time length of the message, number of pages of the message), identifier for the sending client device (e.g., sender name and/or phone number), the message type, etc. The message UI 1300 may also display a selectable "presentation" icon 1310 corresponding to each current message that may be selected for presenting (e.g., viewing or playing back) the current message.

The message UI 1300 may provide one or more embedded application UIs 1315 for one or more embedded applications. In some embodiments, the message UI may provide a different embedded application UI for each embedded application. Each embedded application UI may comprise different features and selectable icons depending on the embedded application. In the example of FIG. 13A, the message UI 1300 provides an audio UI 1315 for an audio player, the audio UI having, for example, a selectable playback and pause button, forward and rewind controls, mute, and volume controls. In other embodiments, however, the message UI 1300 may provide fax/text UI for a fax/text viewer, a video UI for a video player, or a picture UI for a picture viewer.

In some embodiments, an embedded application UI 1315 may be integrated in the same window as the message UI 1300 (as shown in the example of FIG. 13A). In these embodiments, an embedded application UI 1315 is displayed in a same window that also displays the message information 1305 of one or more current messages. Within the window of the message UI, the integrated embedded application UI may have a first appearance (e.g., darker color) when it is inactive (not presenting a message file) and have a second appearance (e.g., lighter color) when it is active and presenting a message file, wherein the first and second appearances are different. Integrated embedded application UIs may be provided for commonly used embedded applications. For example, since voice messages are commonly received, an audio UI 1315 for an audio player may be always displayed in the same window as the message UI. In other embodiments, the integrated embedded application UI 1315 is another type of UI other than an audio UI. By configuring an embedded application UI 1315 in this manner, the message UI 1300 may present messages in a seamless and integrated manner.

In other embodiments, an embedded application UI may be displayed in a separate window (e.g., pop-up window) as the message UI when selected. A non-integrated embedded application UIs may be provided for non-commonly used embedded applications. For example, since video messages are less commonly received, a video UI for a video player may be displayed in a pop-up window when a video message is selected for presentation. In other embodiments, however, the video UI for the video player may be integrated similar to the audio UI as described above, and displayed in the same window as the message UI.

In addition to presenting messages, the message UI 1300 may also provide other selectable icons for additional message functions. As shown in the example of FIG. 13A, the additional message functions may include message forwarding, message delete, marking a message as read or unread, blocking sender, downloading and saving message to local storage, calling sender, sending a fax, adding a new contact, etc. Upon receiving a user selection of a message function, the message UI executes the message function in response. These additional message functions may also be provided by embedded applications configured for performing the additional message functions.

Figure 13B:
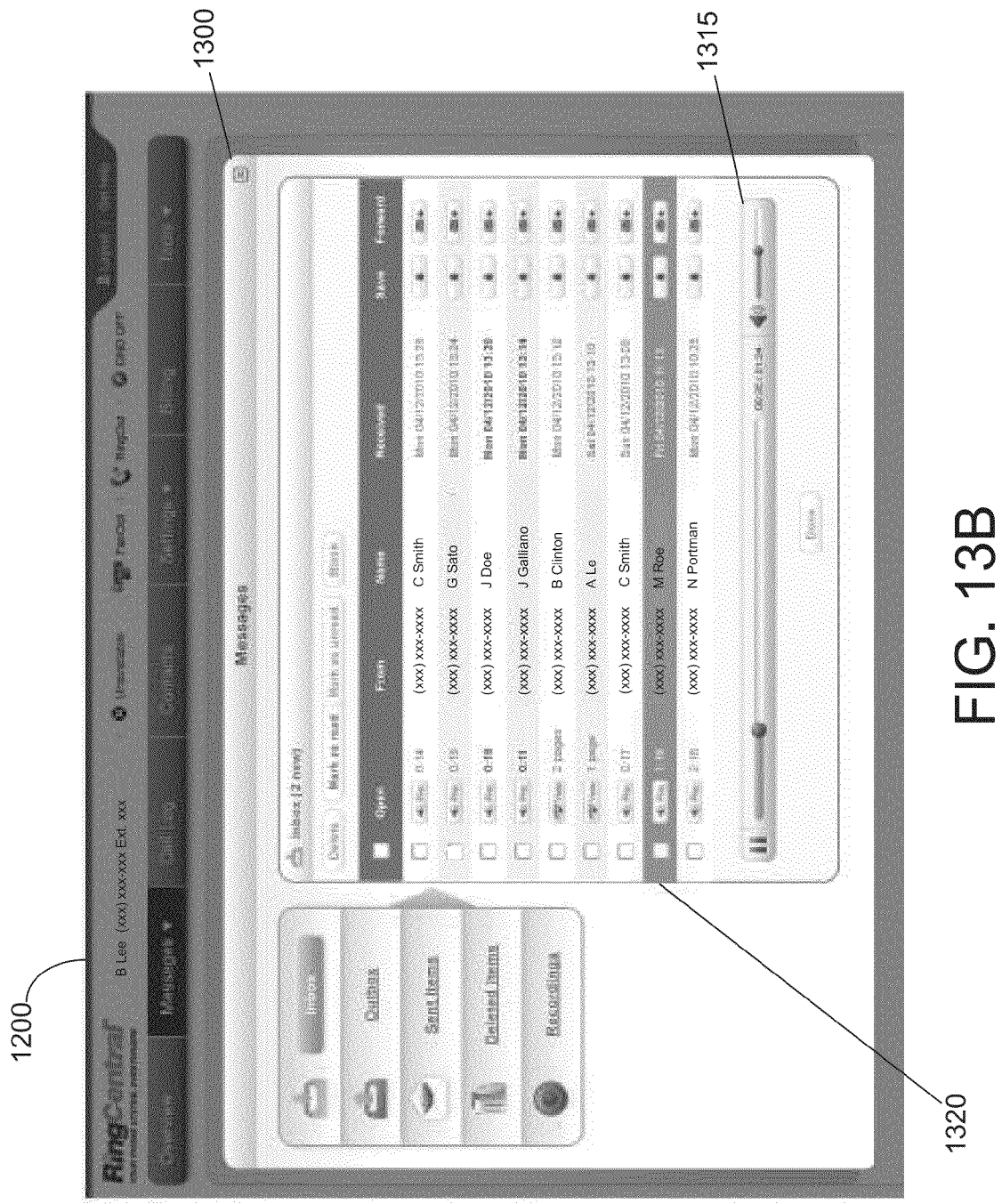

FIG. 13B shows an example of a current message being selected for presentation. As shown in FIG. 13B, a current message comprising a voice/audio message 1320 has being selected for presentation. As such, the message UI 1300 executes an embedded audio application (having audio UI 1315) to playback the voice/audio message 1320.

Figure 13C:
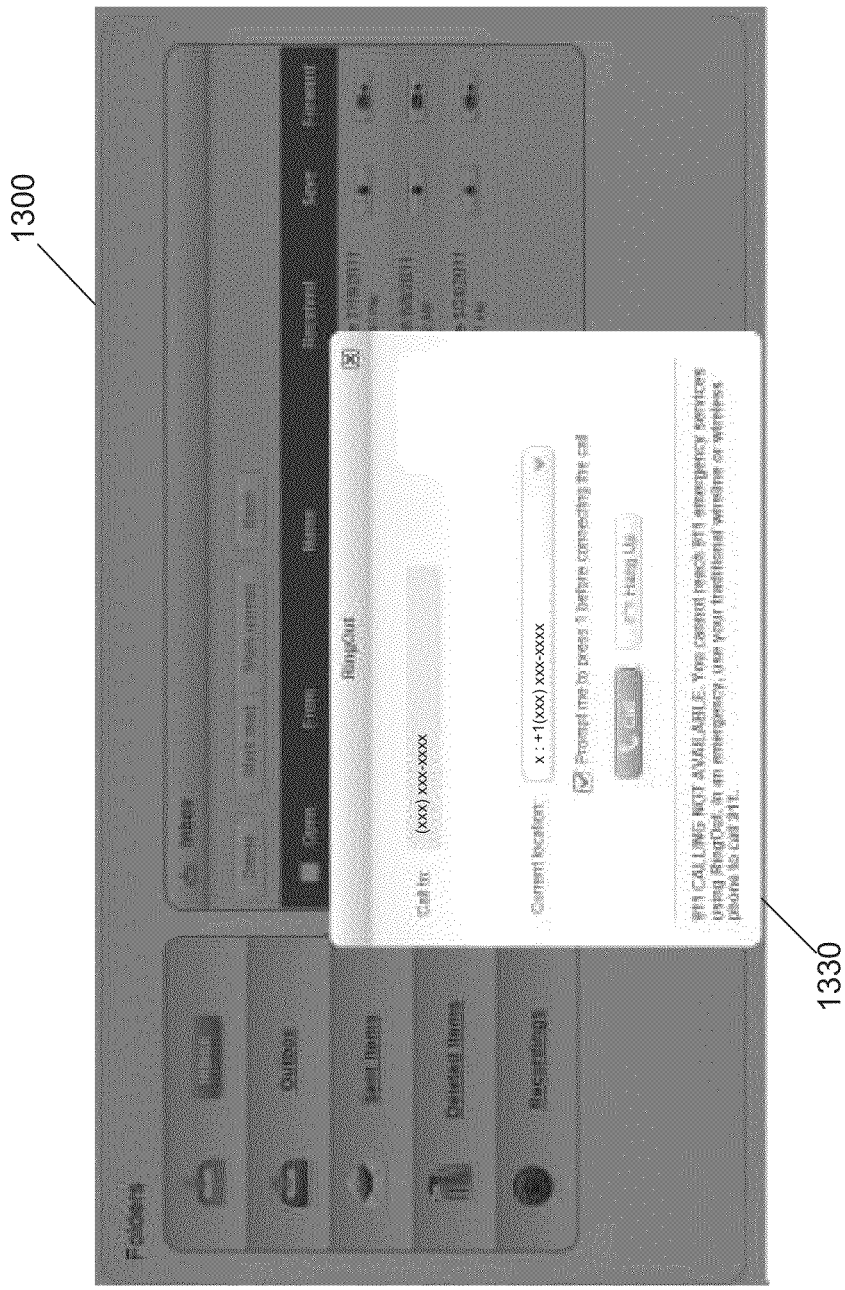

FIG. 13C shows an example of a softphone UI 1330 for calling back a selected sender number. The softphone UI 1330 may be invoked, for example, upon receiving a user selection of a sender phone number. As shown in FIG. 13C, upon being invoked, the message UI 1300 executes and displays the softphone UI 1330 in a separate pop-up window. The softphone UI 1330 may comprise fields for receiving user inputs.

Figure 13D:
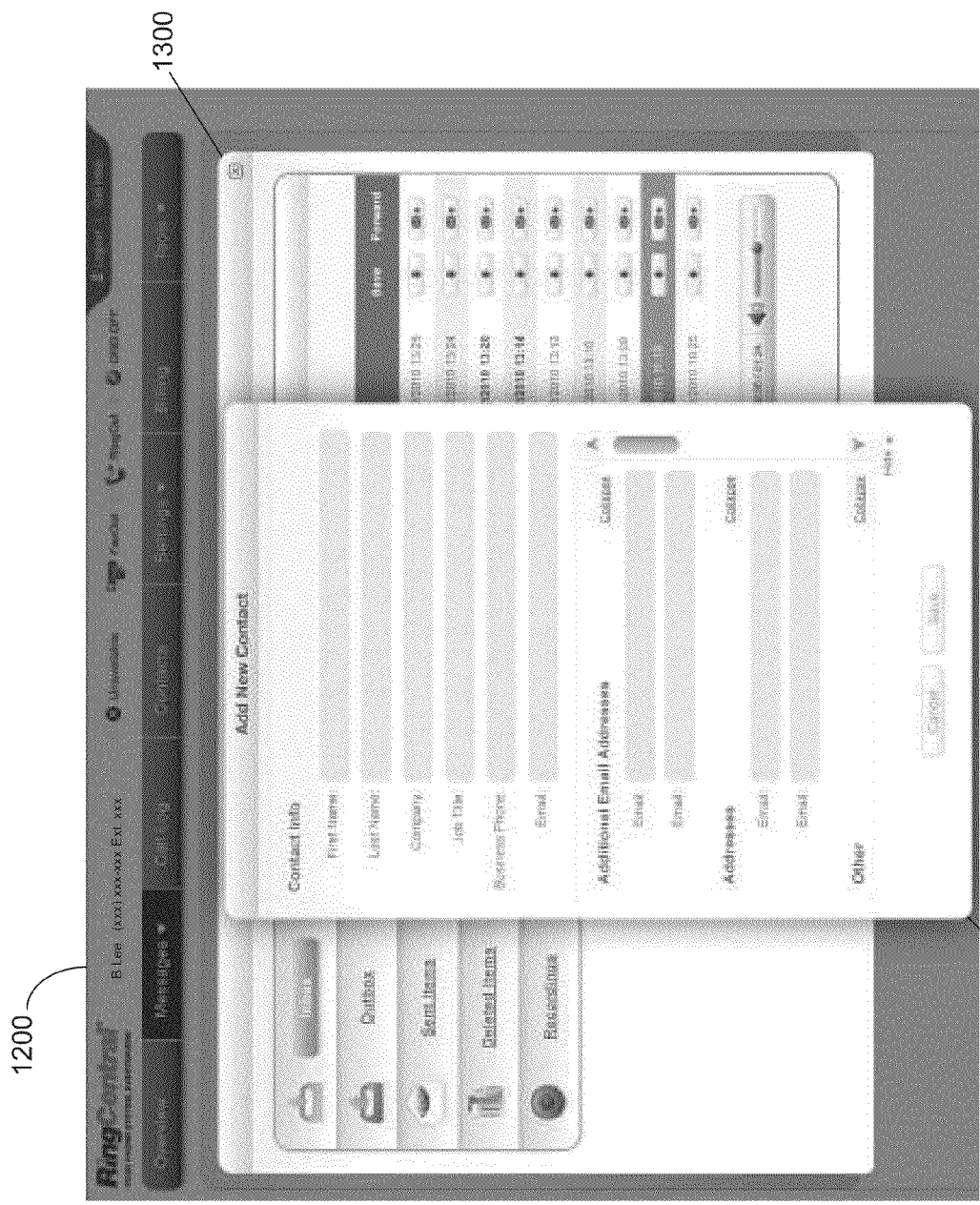

FIG. 13D shows an example of a contact UI 1335 for adding a new contact. The contact UI 1335 may be invoked, for example, upon receiving a user selection of a sender name. As shown in FIG. 13D, upon being invoked, the message UI 1300 executes and displays the contact UI 1335 in a separate pop-up window. The contact UI 1335 may comprise fields for receiving user inputs.

Figure 13E:
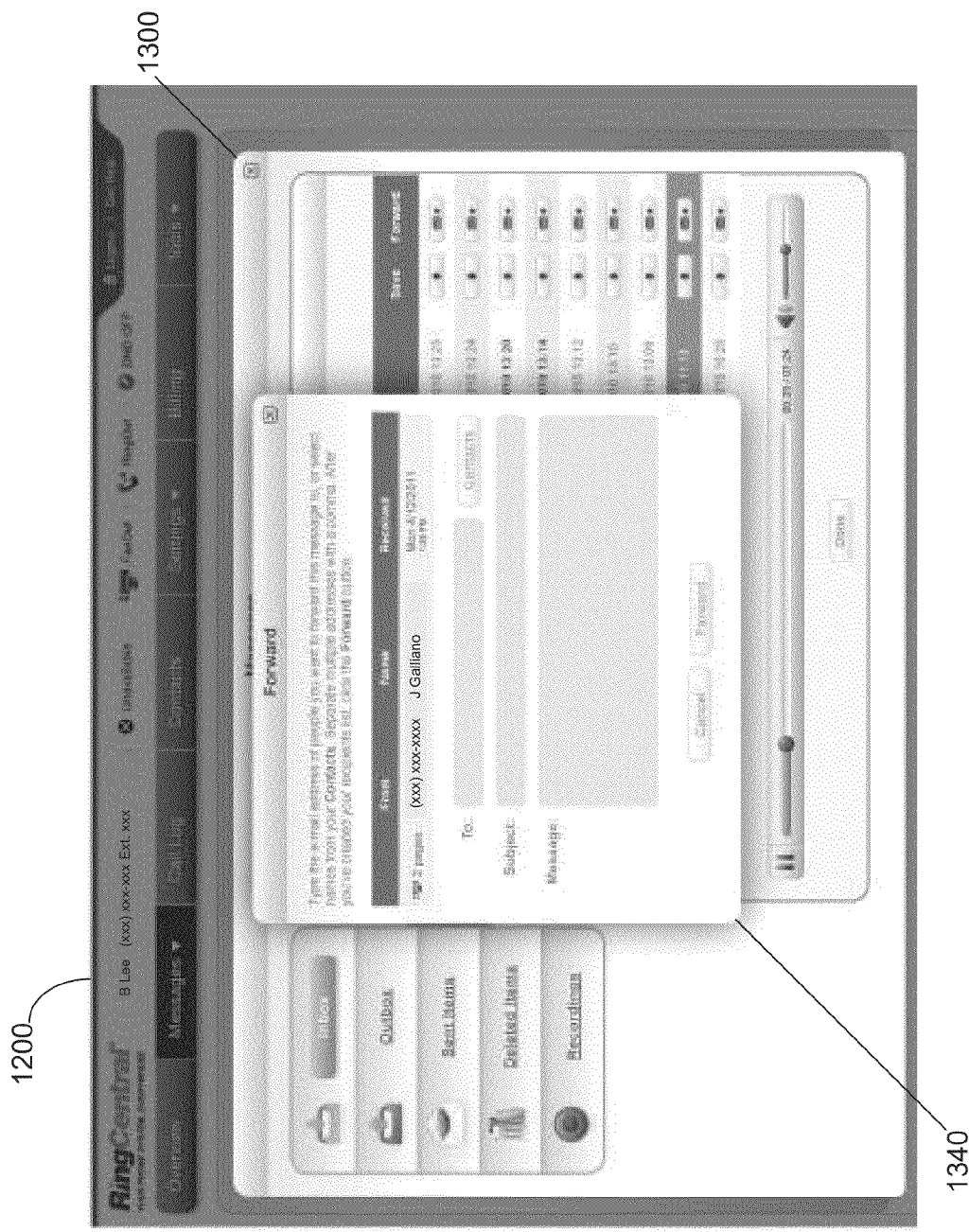

FIG. 13E shows an example of a message forward UI 1340 for forwarding a message to one or more intended recipients. The message forward UI 1340 may be invoked, for example, upon receiving a user selection of "forward" icon. As shown in FIG. 13E, upon being invoked, the message UI 1300 executes and displays the message forward UI 1340 in a separate pop-up window. The message forward UI 1340 may comprise fields for receiving user inputs. The message forward UI 1340 may be used to forward messages of any type (e.g., fax, text, voice, video, picture, etc.), for example, to a phone number or email address.

C. Screen Shots and Functions of the Settings UI

Figure 14A:
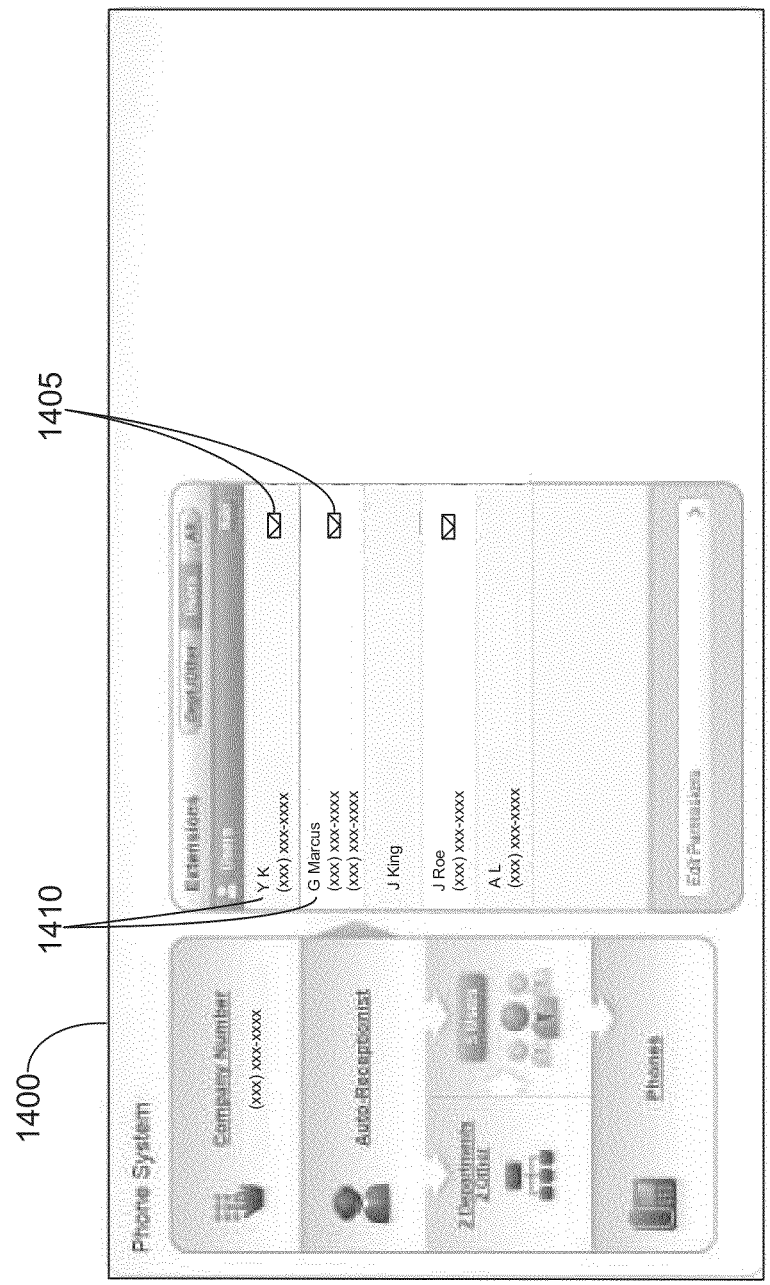
FIGS. 14A-B show exemplary screen pages of a settings UI in accordance with some embodiments.
Figure 14B:
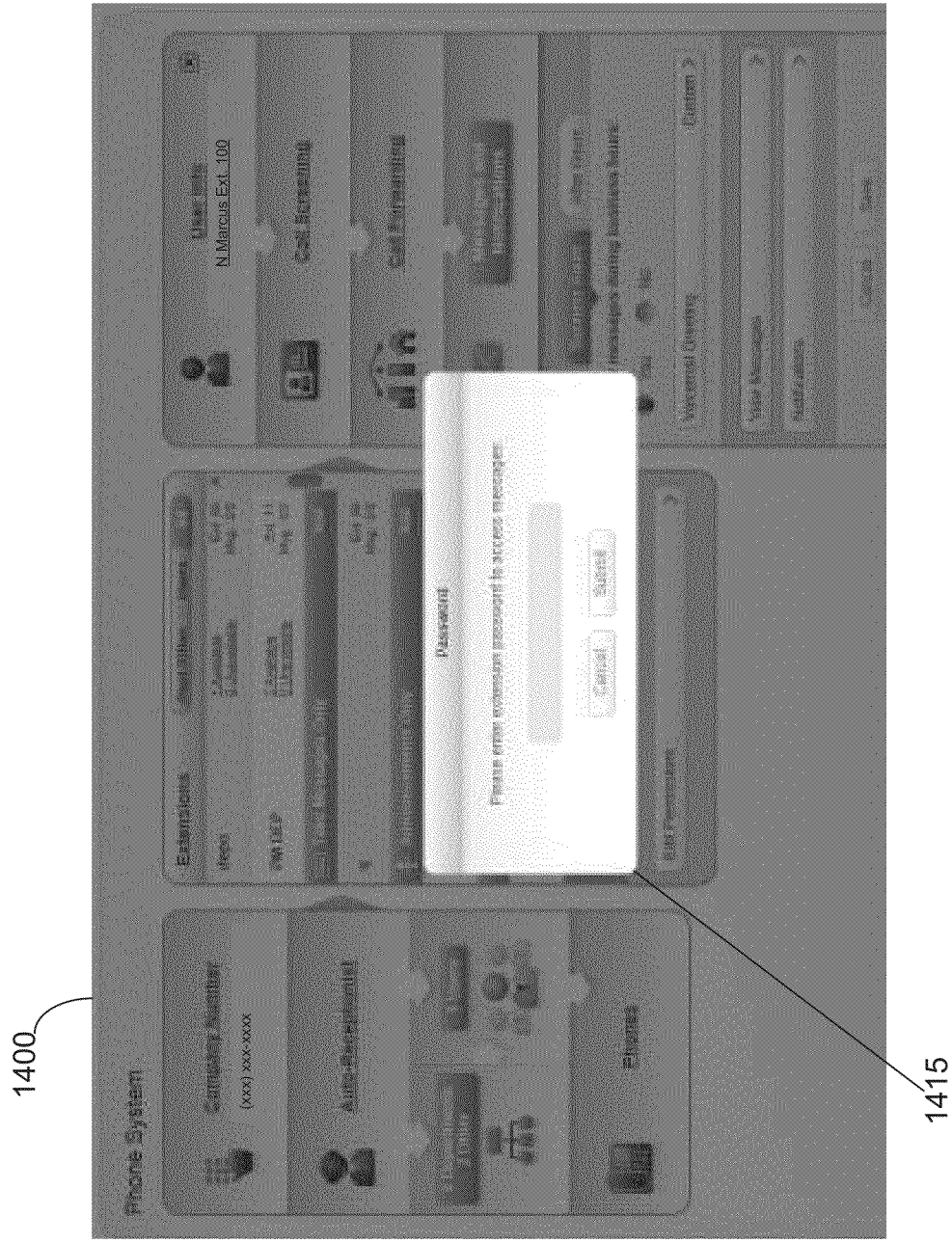

The homepage UI 1200 may receive a user selection of the "settings" icon. If so, the receiving client device 250 executes the settings UI. FIGS. 14A-B show exemplary screen pages of a settings UI 1400 in accordance with some embodiments. In some embodiments, the receiving client device 250 may display the settings UI 1400 as a separate pop-up window that overlays the homepage UI 1200.

The settings UI 1400 may be used by an administrator to access messages of other users through the message access system 230 and to perform various administrative functions. The settings UI 1400 may provide message lists and message files of other users utilizing the devices and methods described herein. The administrator may select for presentation (viewing or playback) any message of any user if the administrator enters the password for the user.

FIG. 14A shows an example of the settings UI 1400 displaying a new message indicator 1405 for a plurality of different users 1410 of a group (e.g., company, location site, division, etc.). The users may be identified by name and/or phone number and extension number. The new message indicator 1405 may indicate if the user has received a new message. FIG. 14B shows an example of a password UI 1415 that is displayed when the administrator selects for presentation a message of a user. Upon entering a correct password, the settings UI 1400 may provide message information and the message file of the selected message utilizing the devices and methods described herein.

V. PROTOCOL FOR MESSAGE DATA

In an alternative embodiment, different connection paths and network protocols are used for UI data and message data. In these embodiments, an HTTP protocol may be used on a first connection, between a receiving client device and a UI server, to provide UI data for producing webpages for an HTML UI and a non-HTTP protocol may be used on a second connection, between the receiving client device and a message server, to provide message data for providing message information and message files to the HTML UI. FIG. 2 is a block diagram of an exemplary message environment 200 in which the alternative embodiment may operate. Components of the exemplary message environment 200 are described above in relation to FIG. 2 and are not discussed in detail here.

A. Message Access System and Receiving Client Device

Figure 15:
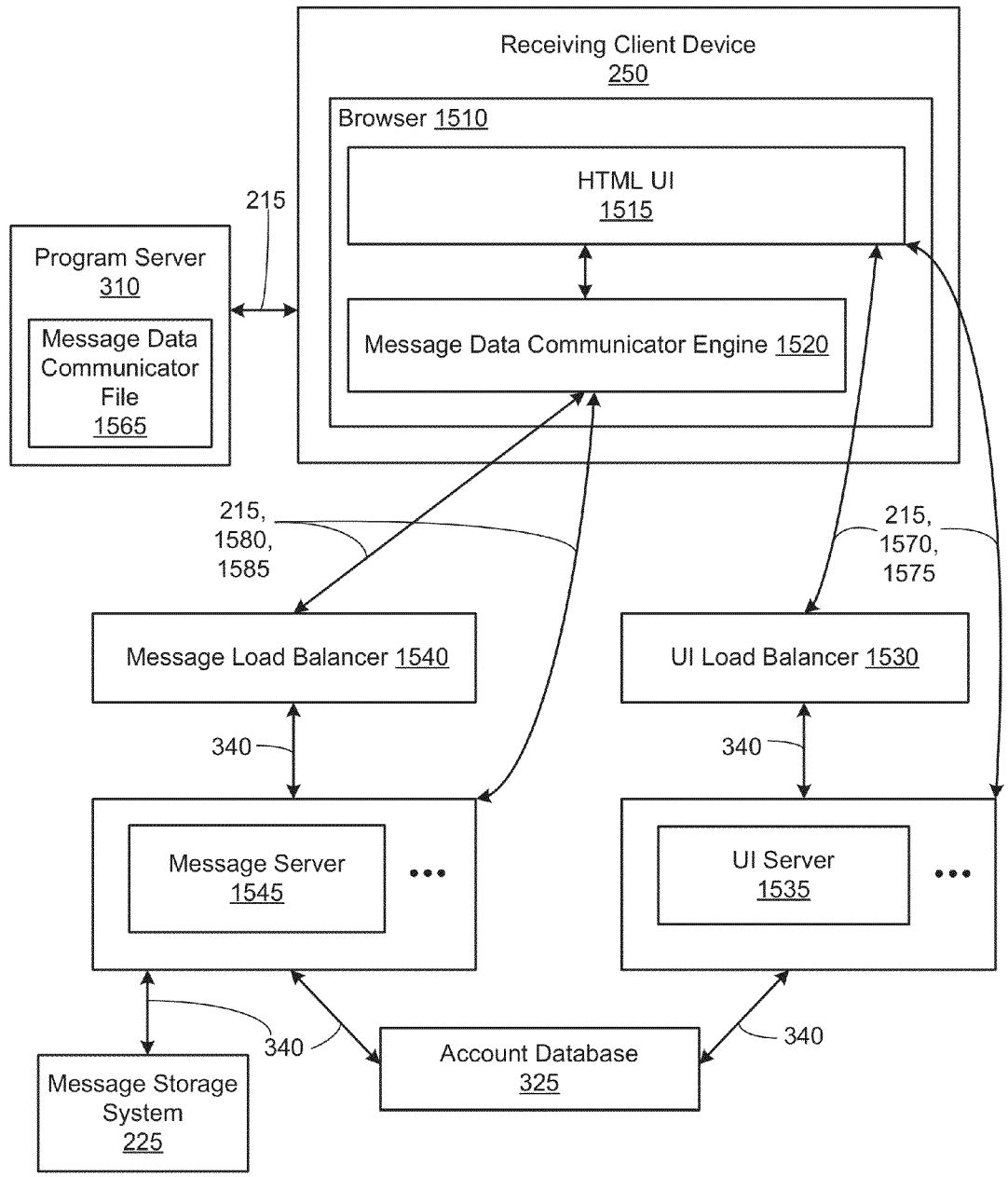
FIG. 15 is a conceptual diagram showing components and interactions of an exemplary message access system in which some embodiments operate.

FIG. 15 is a conceptual diagram showing components and interactions of an exemplary message access system in which some embodiments operate. In some embodiments, the message access system comprises at least one program server 310, at least one UI load balancer 1530, at least one UI server 1535, at least one message load balancer 1540, at least one message server 1545, and at least one account database server 325. Some components of FIG. 15 have features and functions similar to the corresponding components described above in relation to FIG. 3, and only differences in the features and functions of the corresponding components are discussed in detail here.

A receiving client device 250 may be connected to the program server 310, UI load balancer 1530, UI server 1535, message load balancer 1540, and message server 1545 through the connection system 215. The various components of the message access system and the message storage system 225 may be interconnected through a computer network 340.

In some embodiments, the message access system comprises three different servers: a program server 310, a UI server 1535, and a message server 1545 having different functions. Each server may comprise a computer system (having hardware and software) in a network that is shared by multiple users. The program server 310 may store a message data communicator file (shown as message data communicator file 1565) that is transmitted to a receiving client device 250 using a non-HTTP protocol. Each receiving client device 250 may download/receive and install the message data communicator file 1565 from the program server 310. Once installed, the message data communicator file 1565 may provide a message data communicator engine 1520 on the receiving client device 250.

Preferably, the message data communicator file 1565 comprises only Flash® programming instructions. The message data communicator file 1565 may comprise Flash® programming instructions for providing a non-HTTP protocol for receiving and transmitting message data (message information and message files) and for performing various functions when executed, as described herein. Preferably, the message data communicator file 1565 is in the Small Web Format (SWF) format as a .swf file. The message data communicator engine executes the message data communicator file 1565 to perform embodiments herein.

As shown in FIG. 15, the receiving client device 250 comprises a web browser 1510 comprising an HTML UI 1515 and the message data communicator engine 1520. The HTML UI 1515 may be used by a user to access his/her messages through the message service system 220. For illustrative purposes only, the UI is described below as an HTML UI. However, other markup languages may be used other than HTML, such as XML, Standard Generalized Markup Language (SGML), etc. The message data communicator engine 1520 may be used to request and receive message data from the message service system 220.

Through a first HTTP connection 1570 between the receiving client device 250 and a UI server 1535, the HTML UI 1515 receives UI data 1575 from the UI server 1535. The UI data 1575 may comprise data for producing webpages of the HTML UI. For example, the UI data may comprise HTML formatted text, graphics, and/or selectable icons for producing various webpages for accessing messages of the message service system. The UI data is received and processed by the HTML UI 1515, and the resulting webpages are presented on the receiving client device 250. As such, the UI data is formatted is transmitted using HTTP protocol and may be formatted in a markup language (such as HTML).

Through a second non-HTTP connection 1580 between the receiving client device 250 and a message server 1545, the message data communicator engine 1520 receives message data 1585 from the message server 1545. The message data 1585 may comprise message information or message files intended for the user of the receiving client device 250. The message data is received by the message data communicator engine 1520, which sends the message data to the HTML UI 1515 which presents the message data on the receiving client device 250. As such, the message data is transmitted using a non-HTTP protocol.

Figure 16:
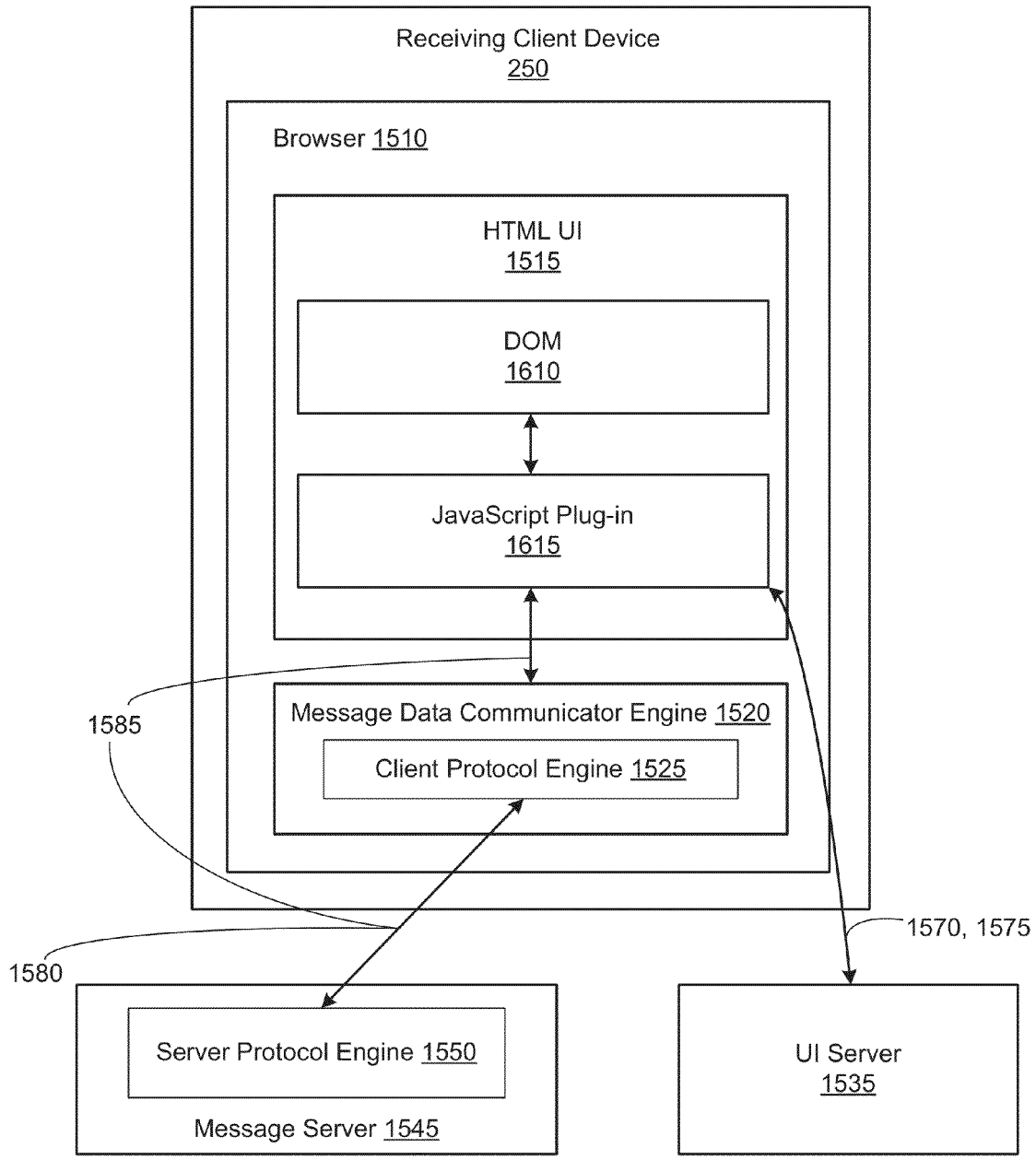
FIG. 16 is a conceptual diagram showing components of an exemplary receiving client device in which some embodiments operate.

FIG. 16 is a conceptual diagram showing components of an exemplary receiving client device 250 in which some embodiments operate. As shown in FIG. 16, the receiving client device 250 executes the web browser 1510 comprising the message data communicator engine 1520 and the HTML UI 1515. The web browser 1510 may comprise a web browser engine (comprising a UI engine) having computer hardware configured to perform embodiments herein. The message data communicator engine 1520 may comprise computer hardware configured to perform embodiments herein. The receiving client device 250 may also comprise other components, such as a local storage 450, input devices 455, and output devices 460 that are described above in relation to FIG. 4 and the various computer hardware components of the computing devices 1100 or 1150 described in relation to FIG. 11 and are not discussed in detail here.

As shown in FIG. 16, the HTML UI 1515 comprises a document object model (DOM) module 1510 and a JavaScript® plug-in module 1615. The HTML UI 1515 and its components may be downloaded from the UI server 1535 and installed onto the receiving client device 250. Upon being installed on the receiving client device 250, the JavaScript plug-in 1615 executes to produce webpages of the HTML UI 1515 through the DOM 1510. As known in the art, the DOM 1510 is a cross-platform and language-independent convention for representing and interacting with objects in HTML, XHTML and XML documents. The JavaScript plug-in 1615 may use the DOM 1510 to produce and modify webpages dynamically.

The JavaScript plug-in 1615 receives UI data 1575 (e.g., HTML formatted text, graphics, and/or selectable icons) from the UI server 1535 and produces the webpages of the HTML UI 1515 through the DOM 1610. The UI server 1535 may transmit the UI data 1575 through the HTTP connection 1570. In some embodiments, the UI data 1575 only contains data for producing the webpages of the HTML UI and does not include any message data (message information or message files).

In the preferred embodiment, the JavaScript plug-in 1615 executes JavaScript code that requests message data from the message data communicator engine 1520. In this way, the logic for producing the web page is encapsulated in the UI data obtained from the UI server 1535. The message data communicator engine 1520 receives and performs requests from the JavaScript plug-in 1615 and serves as a component responsible for obtaining message data through, for example, the most efficient means. The logic embedded in the UI data (e.g., the JavaScript and HTML) can query the message data communicator engine 1520 for message data as needed without concerning itself as to how the data is transmitted to the receiving client device 250. In this way, the UI data concerns itself solely with, among other things, how message data is presented to the user.

When message data 1585 is to be presented on the webpages of the HTML UI 1515, the JavaScript plug-in 1615 may request and receive the message data through the message data communicator engine 1520. Upon receiving the message data 1585, the JavaScript plug-in 1615 builds and presents the message data 1585 on the webpages using the DOM 1610. Note that the message data communicator engine 1520 does not interact with the DOM 1610 but only sends the message data 1585 to the JavaScript plug-in 1615, which then interacts with the DOM 1610 to generate the webpages that presents this information to the user. In these embodiments, the JavaScript plug-in 1615 receives message data 1585 only through the message data communicator engine 1520 and does not receive message data 1585 directly from a server. The message server 1545 may transmit the message data 1585 through the non-HTTP connection 1580. In some embodiments, the message data 1585 is only transmitted to the receiving client device 250 using the non-HTTP connection 1580.

As shown in FIG. 16, on the receiving client device 250, the message data communicator engine 1520 comprises a client protocol engine 1525 and the message server 1545 comprises a server protocol engine 1550. As discussed above, the message data communicator file 1565 may be installed on the receiving client device 250 to produce the message data communicator engine 1520. Preferably, the message data communicator file 1565 comprises only Flash® programming instructions. As such, the message data communicator engine 1520 including the client protocol engine 1525 also comprises only Flash® programming instructions. In some embodiments, the server protocol engine 1550 also comprises only Flash® programming instructions. As known in the art, Flash programming instructions is compatible with many different types of web browsers (such as Microsoft Internet Explorer™, Mozilla Firefox™, Google Chrome™, etc.). In other embodiments, however, the message data communicator engine 1520 (including the client protocol engine 1525) and the server protocol engine 1550 comprises other types of programming instructions, for example, Active X™ or C++ programming instructions. In these embodiments, the message data communicator engine 1520 may comprise a plug-in program to the web browser 1510.

B. Non-HTTP Protocol and Immediate Notification Embodiments

In some embodiments, while the receiving client device 250 is accessing message from the message service system, the receiving client device 250 may be simultaneously connected to the message service system through two different connections of different connection types for transmitting different data types. A first HTTP connection 1570 transmits UI data 1575 between the UI server 1535 of the message service system, the UI data 1575 not comprising any message data 1585. A second non-HTTP connection 1580 transmits message data 1585 between the message server 1545 of the message service system, the message data 1585 not comprising any UI data 1575. In these embodiments, the receiving client device 250 may simultaneously (in parallel) receive UI data to produce webpages through the first HTTP connection and message data to populate the webpages through the second non-HTTP connection. In another, the receiving client device 250 may simultaneously (in parallel) receive UI data over the non-HTTP connection 1580. As used herein, "simultaneous" indicates a same or overlapping timeframes.

The non-HTTP connection 1580 between the receiving client device 250 and the message server 1545 may be implemented using a non-HTTP protocol defined and provided by the client protocol engine 1525 (on the receiving client device 250 side) and the server protocol engine 1550 (on the message server 1545 side). The client and server protocol engines provide a communication layer that uses non-HTTP protocol.

Preferably, message data 1585 is transmitted and received between the various components using only a non-HyperText Transfer Protocol (non-HTTP). For example, the message data 1585 may be transmitted and received in only a non-HTTP protocol between the message storage system 225, account database 325, message server 1545, message load balancer 1540, and the receiving client device 250. In further embodiments, the message data communicator file 1565 stored on the program server 310 is transmitted to the receiving client device 250 using a non-HTTP protocol.

In these embodiments, the message data 1585 may be transmitted using a custom protocol (i.e., a protocol proprietary to this system) or standard protocol (e.g., File Transfer Protocol (FTP) or jWebSocket) that is a non-HTTP protocol. In some embodiments, the non-HTTP protocol comprises a protocol layer on top of a TCP protocol connection that provides the non-HTTP connection 1580.

As known in the art, jWebSocket comprises a non-HTTP network protocol comprising Flash programming instructions and is compatible with JavaScript language. As known in the art, jWebSocket provides persistent connections between a server and client device. A jWebSocket connection does not disconnect with the client device after each request from the client device is completed by the server. The jWebSocket connection typically disconnects only after the session between the server and client device is completed (e.g., after receiving a user logout from the client device). As known in the art, the HTTP protocol disconnects with the client device after each request from the client device is completed and a new connection needs to be established for the next request. As such, overall the jWebSocket connection will provide faster response times during the course of a message session between the receiving client device and the message service system.

Further, jWebSocket allows servers to "push" data to client devices, whereby data is sent to a client device without requiring the client device to request the data. As known in the art, the HTTP protocol only allows for the "pulling" of data, whereby a server sends data to a client device only upon receiving a request for the data from the client device. In some embodiments, the message service system 220 will "push" (send) message data 1585 comprising notifications of new messages and calls to the receiving client device 250 automatically when any new message or call is received. As such, message data 1585 comprising "immediate notifications" of new messages and calls are sent immediately to the receiving client device 250 as soon as a new message or call is received for the user of the receiving client device 250, without requiring the receiving client device 250 to request such message data 1585 from the message service system 220.

In some embodiments, an "immediate notification" relates to a new message or new call for the user that is received and processed by the message service system 220 during a "message session" time period when the user is currently reviewing and accessing his/her current messages using the HTML UI 1515. The message session time period begins from a first event and ends at a second event. In these embodiments, the first event comprises the approximate point in time when the receiving client device 250 requests a message list of current messages for the user and the message service system 220 sends the message list to the receiving client device 250. The second event may comprise the approximate point in time that the message server receives a "session-end" request from the client device. For example, the session-end request may comprise a user logout request or a user request to close the HTML UI 1515 used for accessing messages on the message service system 220.

As described above, immediate notifications relate to only those new messages or calls received by the message service system 220 during the message session. As such, immediate notifications give real-time notifications of new messages or calls that have just been received during the message session and are not included in the message list of current messages that was previously sent to the receiving client device 250 at the beginning of the message session. In some embodiments, the HTML UI 1515 provides a softphone application for calling back a selected sender number. As such, the user can receive notifications in real-time and respond in real-time by calling the sender back upon receiving an immediate notification.

C. Non-Markup Language Embodiments

Message data 1585 comprising message information may be formatted in a non-markup language when stored (e.g., in the message storage system 225, the account database 325, and the receiving client device 250) and transmitted between the components of the message service system (e.g., between the message storage system 225, account database 325, message server 1545, and the receiving client device 250.

In some embodiments, the message information is stored and transmitted in comma-delimited format, JavaScript Object Notation (JSON), or in another type of non-markup language format. As known in the art, the JSON format is a subset of JavaScript language but is language-independent and compatible with most all programming languages. The JSON format provides a text-based data interchange format for use between various programming languages and may comprise key-value pairs and arrays, which are common structures in many programming languages.

D. Method for Providing Message Data Protocol and UI Screen Shots

Figure 17A:
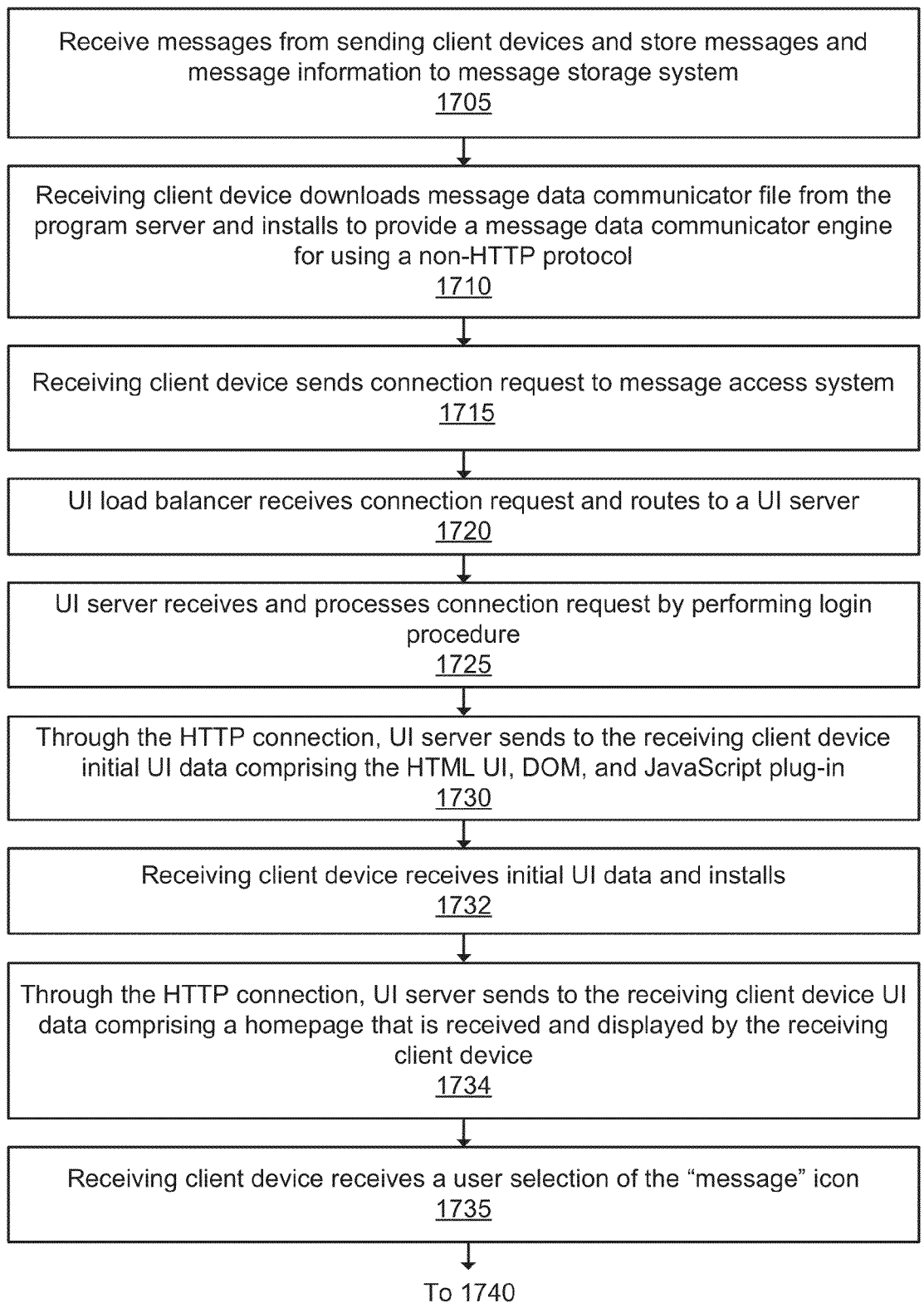
FIGS. 17A-C show a flowchart of a method for providing a protocol for messages data on a message service system.
Figure 17B:
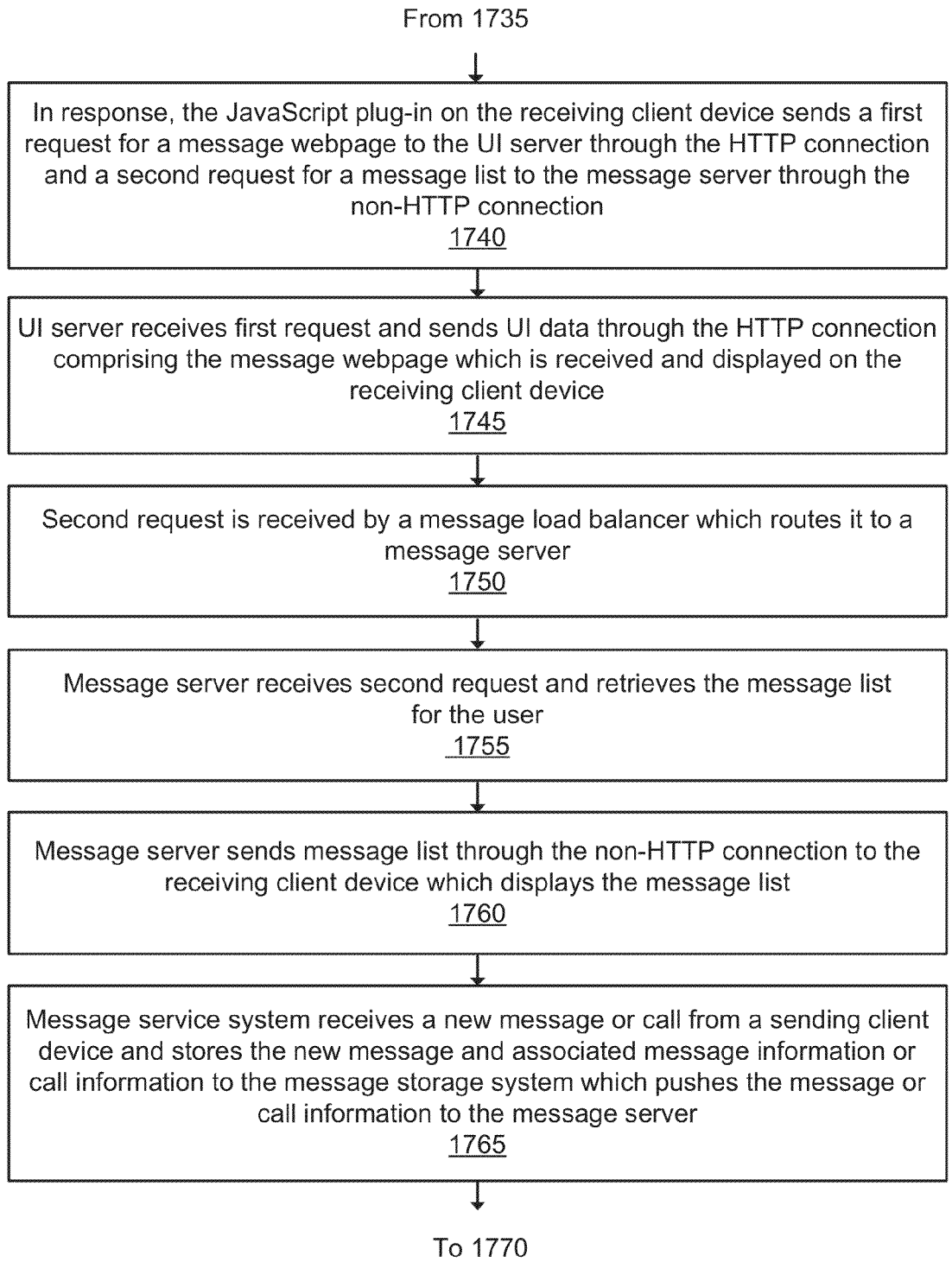
Figure 17C:
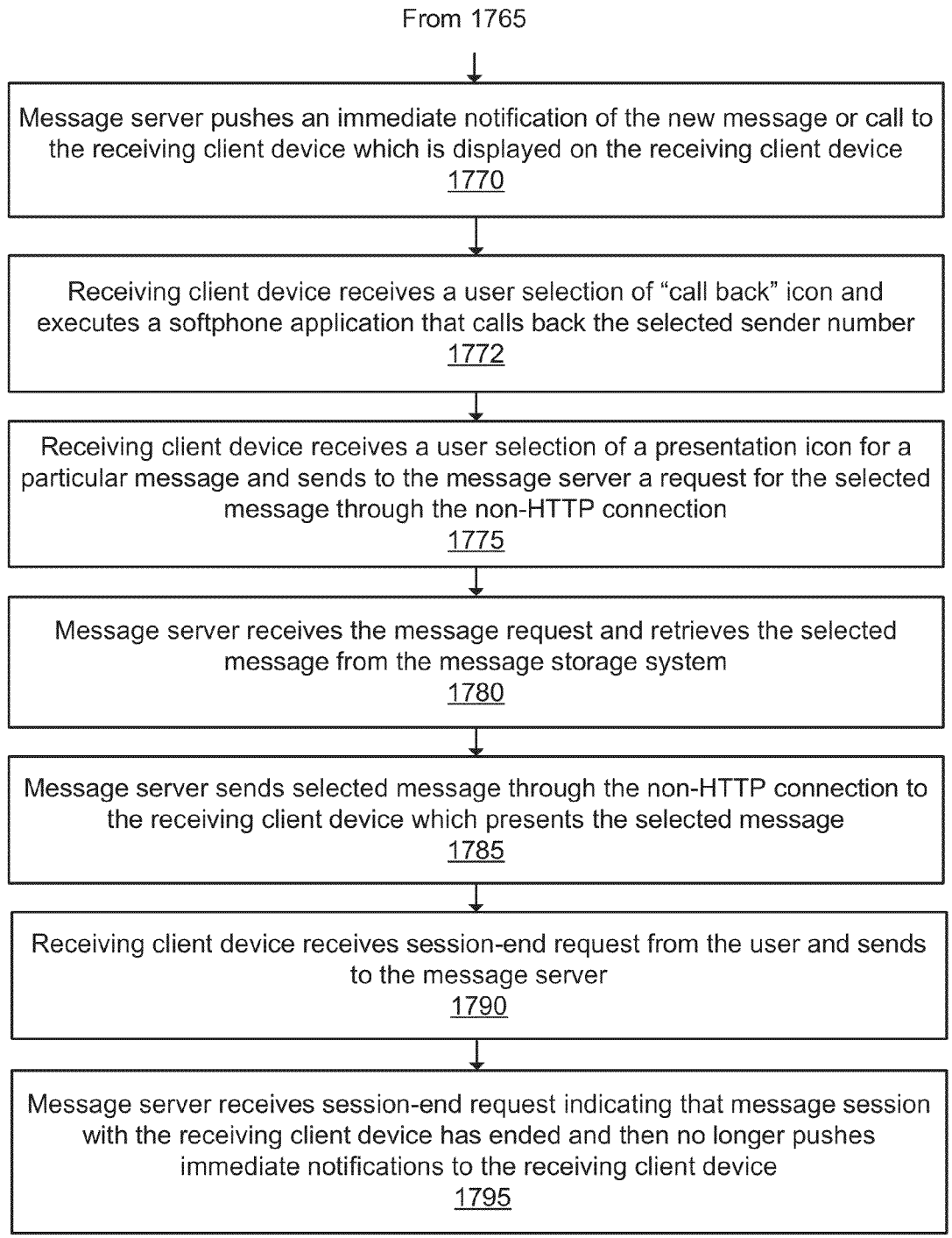

FIGS. 17A-C show a flowchart of a method 1700 for providing a protocol for messages data on a message service system 220. The method 1700 is described in relation to FIGS. 2, 15, and 16 which conceptually illustrate the steps of the method 1700. The method 1700 is also described in relation to FIGS. 18A-D which show conceptual diagrams of exemplary webpages of the HTML UI. The order and number of steps of the method 1700 are for illustrative purposes only to demonstrate various operations that may be performed. In other embodiments, however, a different order and/or number of steps may be used.

The method 1700 begins by the message service system 220 receiving (at 1705) messages from sending client devices 205 through the connection system 215 and storing the messages and message information for each message to the message storage system 225. The stored messages may comprise message files of a plurality of different message types in a plurality of different format types. The message information for a message may also be stored with the message.

The receiving client device 250 downloads (at 1710) the message data communicator file 1565 from the program server 310 and installs the message data communicator file 1565 to provide a message data communicator engine 1520 on the receiving client device 250. The message data communicator engine 420 may comprise a client protocol engine 1525 configured to communicate with a server protocol engine 1550 on a message server 1545 using a non-HTTP protocol, the client and server protocol engines defining and providing the non-HTTP protocol.

The receiving client device 250 then sends (at 1715) a connection request to the message access system (e.g., by using the web browser 1510 to submit a web address associated with the message access system). A UI load balancer 1530 of the message access system receives (at 1720) the connection request and sends the request to one of the UI servers 1535. The UI load balancer 1530 may be configured to receive and distribute connection requests from receiving client devices 250 to the UI servers 1535 for processing (e.g., route connection requests in rotating sequence to the UI servers 1535 to evenly distribute connection requests).

In the preferred embodiment, the receiving client device 250 always communicates with the UI server 1535 through the UI load balancer 1530. In other embodiments, after a UI server 1535 receives the connection request, the receiving client device 250 may be directly connected with the UI server 1535 through the connection system 215. In some embodiments, the UI server 1535 is connected with the receiving client device 250 through an HTTP connection 1570 during a message session for transmitting UI data 1575 to the receiving client device 250.

The UI server 1535 receives and processes (at 1725) the connection request by performing a login procedure with the receiving client device by receiving login information (e.g., user identifier such as username and/or phone number and password) from the receiving client device. The UI server 1535 may verify the login information using the account database 325 that stores login information for current users/subscribers of the message service system 220.

Through the HTTP connection 1570, the UI server 1535 sends (at 1730) to the receiving client device 250 (e.g., through the UI load balancer 1530) initial UI data 1575 comprising the HTML UI 1515, DOM 1610, and JavaScript plug-in 1615. The receiving client device 250 receives (at 1732) the initial UI data 1575 and installs the HTML UI 1515, DOM 1610, and JavaScript plug-in 1615 onto its web browser 1510.

Figure 18A:
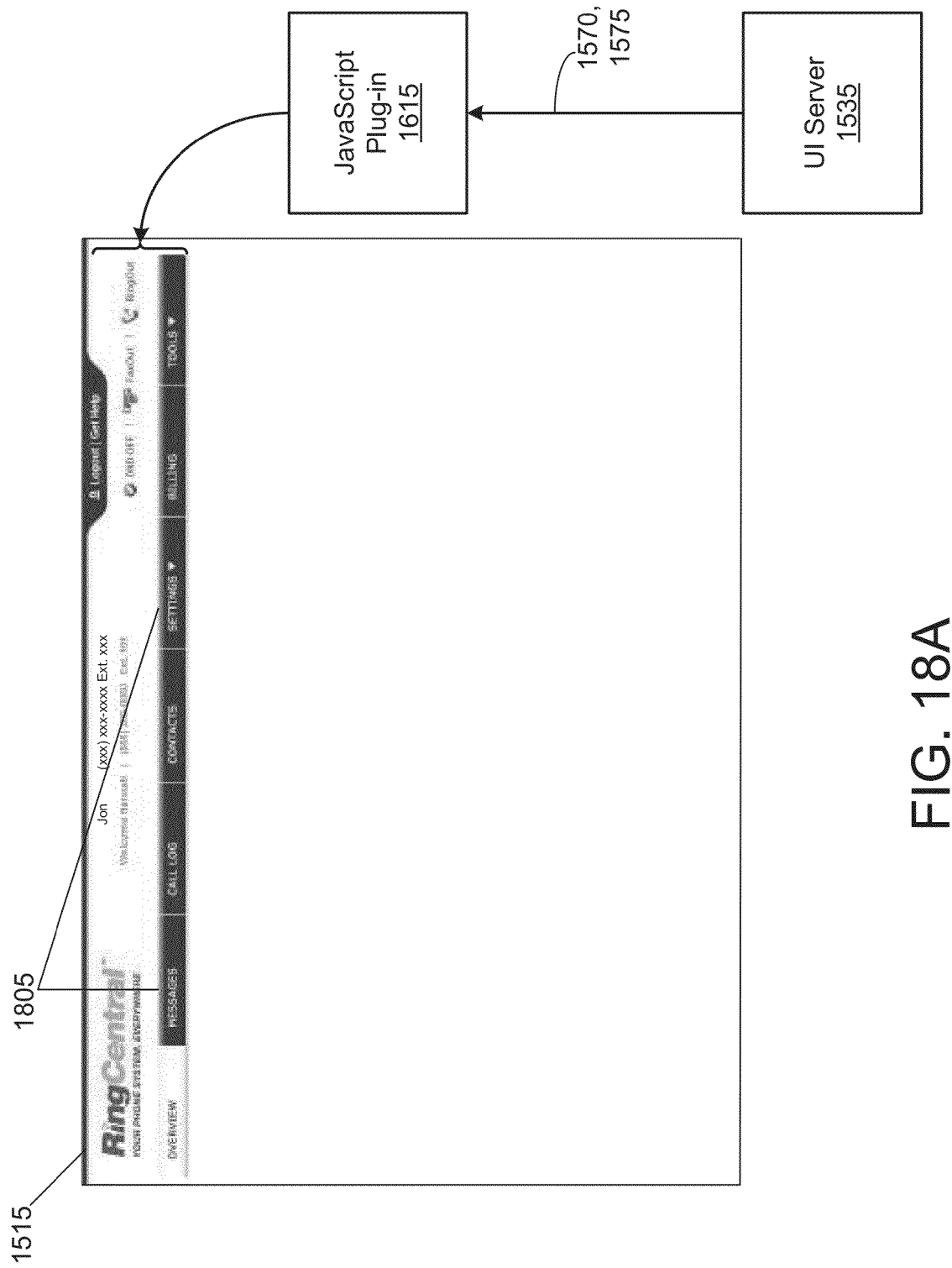
FIGS. 18A-D show conceptual diagrams of exemplary webpages of the HTML UI.

Through the HTTP connection 1570, the UI server 1535 also sends (at 1734) to the receiving client device 250 (e.g., through the UI load balancer 1530) UI data 1575 comprising a homepage for the HTML UI 1515 that is received and displayed by the receiving client device 250. FIG. 18A shows a conceptual diagram of an exemplary homepage of the HTML UI 1515 in accordance with some embodiments. As shown in FIG. 18A, the UI data 1575 comprising the homepage is transmitted by the UI server 1535 through the HTTP connection 1570 and received by the JavaScript plug-in 1615 which produces and presents the homepage in the HTML UI 1515. The homepage may display a plurality of selectable icons 1805, each icon for selecting and requesting a particular webpage and function, such as a "message" icon for selecting a webpage and function for accessing messages and message information for the user. In some embodiments, the homepage does not present any message data.

On the receiving client device 250, the displayed homepage may receive (at 1735) a user selection of the "message" icon. In response, the JavaScript plug-in 1615 on the receiving client device 250 may send (at 1740) a first request for a message webpage to the UI server 1535 and a second request for a message list for the user to the message server 1545. The first request may be sent through the HTTP connection 1570 and the second request may be sent through the non-HTTP connection 1580. In some embodiments, the two requests are sent simultaneously.

Figure 18B:
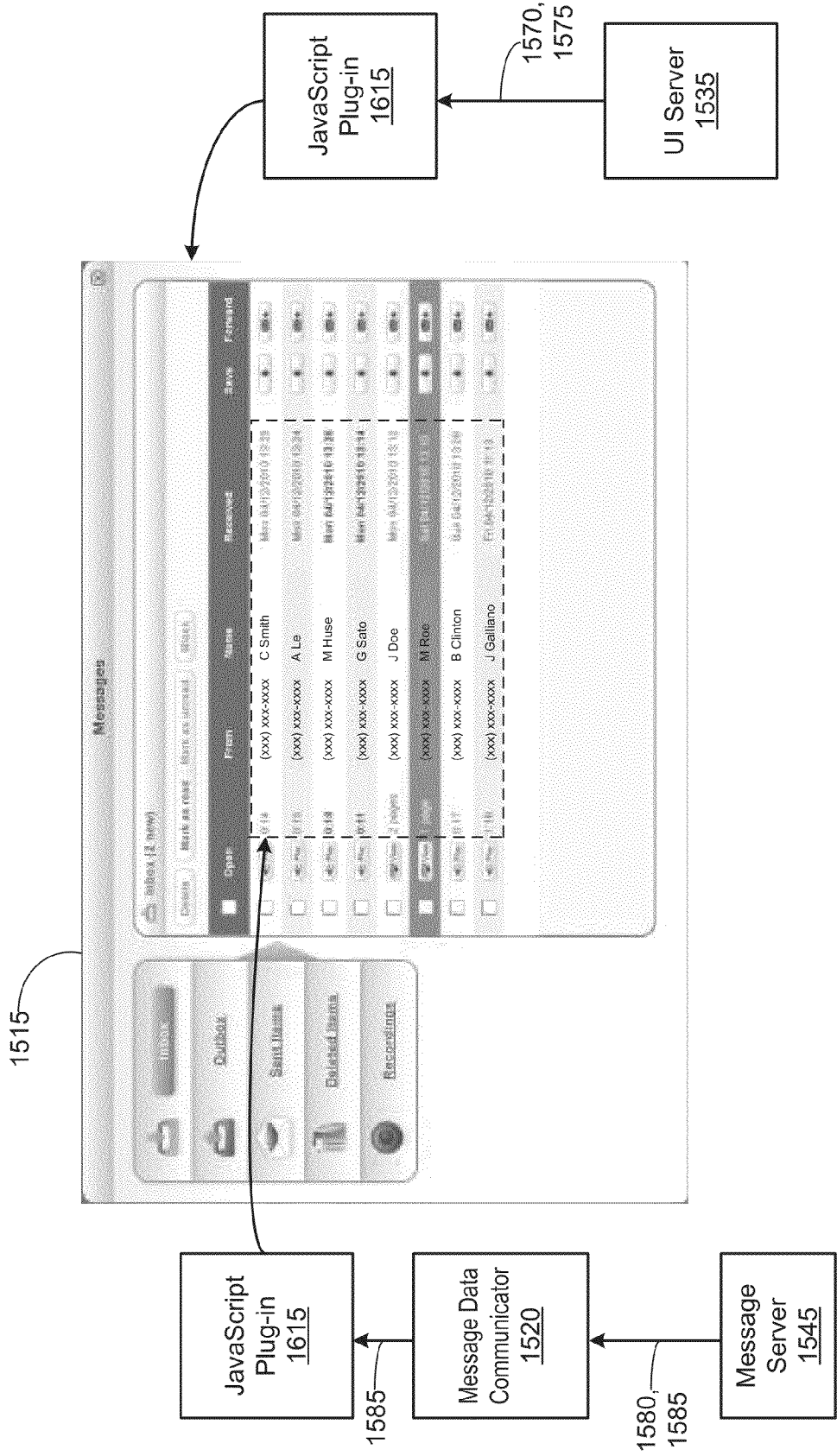

The UI server 1535 receives (at 1745) the first request and sends (e.g., through the UI load balancer 1530) UI data 1575 comprising the message webpage which is received and displayed on the receiving client device 250. FIG. 18B shows a conceptual diagram of an exemplary message webpage of the HTML UI 1515 in accordance with some embodiments. As shown in FIG. 18B, the UI data 1575 comprising the message webpage is transmitted by the UI server 1535 through the first HTTP connection 1570 and received by the JavaScript plug-in 1615 which produces and presents the message webpage in the browser 1510. The UI data 1575 for the message webpage may comprise, for example, text, graphics, and selectable icons for selecting particular message functions. For example, the selectable icons may include a "presentation" icon for each current message for presenting the current message and selectable icons for other message functions, such as message forwarding, message deleting, calling the sender back, sending a fax to the sender, etc. Upon receiving a user selection of a message function, the message webpage executes the message function in response.

The second request may be received (at 1750) by a message load balancer 1540 of the message access system 230 which sends the second request to a message server 1545. The message load balancer 1540 may be configured to receive and distribute requests from receiving client devices 250 to the plurality of message servers 1545 for processing. In the preferred embodiment, the receiving client device 250 always communicates with the message server 1545 through the message load balancer 1540. In other embodiments, after a message server 1545 receives and processes an initial request from a receiving client device 250, the receiving client device 250 may be directly connected with the message server 1545 through the connection system 215.

The message server 1545 receives (at 1755) the second request for the message list and retrieves the message list, or a subset thereof, for the user (as identified by the user identifier) from the account database 325. The message server 1545 then sends (at 760) the message list to the receiving client device 250 (e.g., through the message load balancer 1540) which displays the message list. As shown in FIG. 18B, message data 1585 comprising the message list is transmitted by the message server 1545 (using the server protocol engine 1550) through the second non-HTTP connection 1580 and received by the message data communicator 1520 (using the client protocol engine 1525), which passes the message list to the JavaScript plug-in 1615. The JavaScript plug-in 1615 then presents the message list in the HTML UI 1515 through the DOM module 1510. As shown in the example of FIG. 18B, the message list may comprise message information for current messages of the user.

In some embodiments, a "message session" between the receiving client device 250 and the message service system begins at a time approximate to when the message server 1545 receives (at 1755) the request for the message list, retrieves the message list, and sends (at 1760) the message list to the receiving client device 250. The message session may be considered to begin at any point in time during the performance of these steps. The message session may continue until the user logs off or closes the message webpage.

During the message session, the message service system receives (at 1765) a new message or call from a sending client device 205 and stores the new message and associated message information (for a new message) or call information (for a new call) to the message storage system 225, which pushes/sends the message information or call information to the message server 1545. The message server 1545 then pushes/sends (at 1770) an immediate notification of the new message or call to the receiving client device 250 (e.g., through the message load balancer 1540) without receiving any request from the receiving client device 250 for any new data, and the immediate notification is displayed on the receiving client device 250.

Figure 18C:
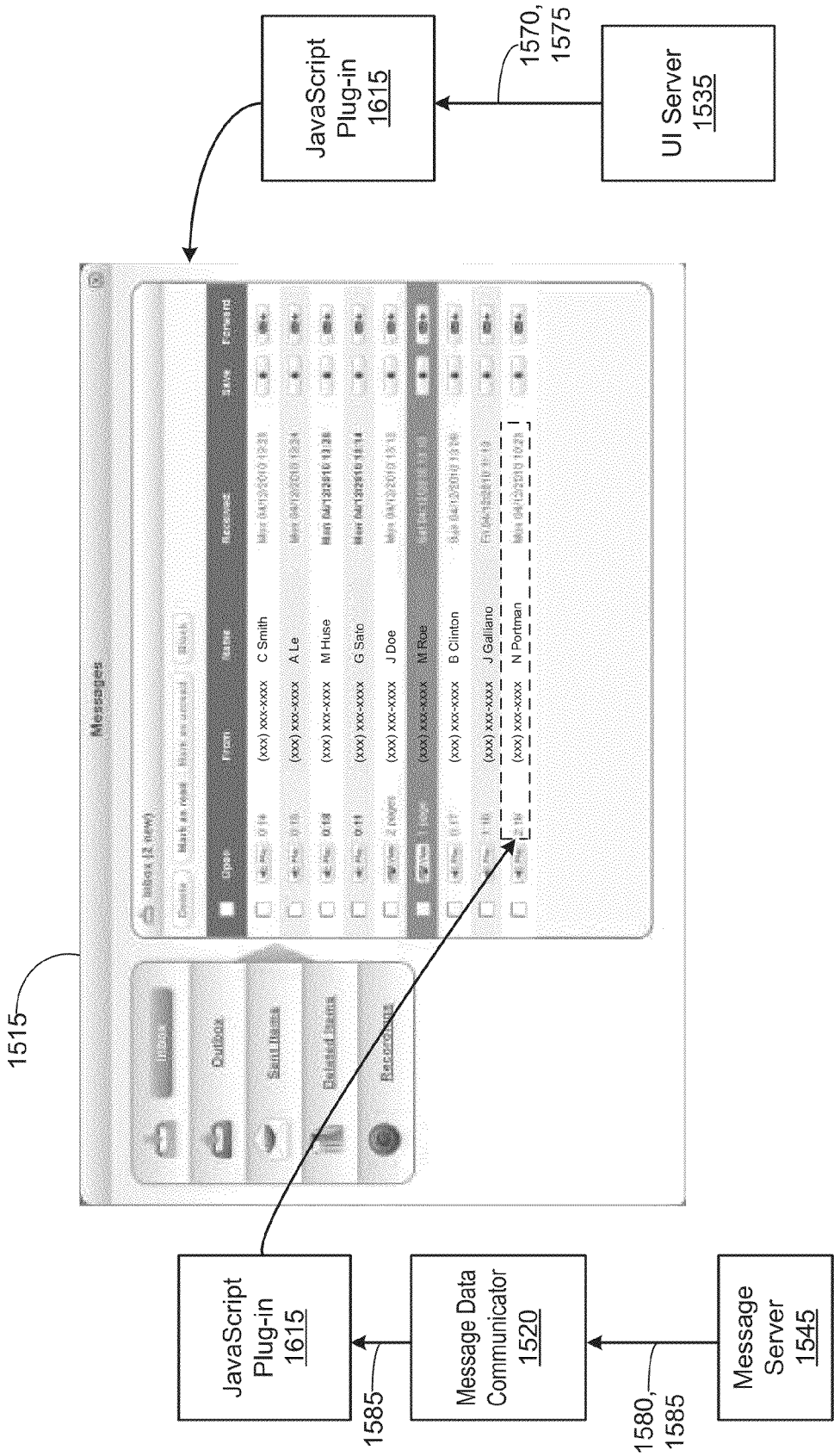

FIG. 18C shows a conceptual diagram of an immediate notification displayed on a message webpage of the HTML UI 1515 in accordance with some embodiments. As shown in FIG. 18B, message data 1585 comprising the immediate notification is transmitted by the message server 1545 (using the server protocol engine 1550) through the second non-HTTP connection 1580 and received by the message data communicator 1520 (using the client protocol engine 1525), which passes the immediate notification to the JavaScript plug-in 1615. The JavaScript plug-in 1615 then presents the immediate notification in the HTML UI 1515. As shown in the example of FIG. 18B, the immediate notification comprises message information for a new message from "N Portman" that was received after the message session began. In other embodiments, the immediate notification may comprise call information for a new call that was received (with no message received) after the message session began. In these embodiments, call information may comprise, for example, an identifier for the sending client device (e.g., sender name and/or phone number), the date and time the call was received, etc. The immediate notification comprises message or call information that was not included in the message list previously sent to the receiving client device 250 when the message session began.

On the receiving client device 250, the message webpage receives (at 1772) a user selection of a "call back" icon for calling a selected sender number. In response, the HTML UI 1515 may execute (at 1772) a softphone application that calls back the selected sender number. As such, the user can receive immediate notifications in real-time and respond in real-time by calling the sender back upon receiving an immediate notification.

On the receiving client device 250, the message webpage receives (at 1775) a user selection of a presentation icon for a particular message. In response, the JavaScript plug-in 1615 sends (at 1775) to the message server 1545 a request for the message file of the selected message through the non-HTTP connection 1580. The message server 1545 receives (at 1780) the message request (e.g., through the message load balancer 1540) and retrieves the filepath for the selected message from the account database 325, then retrieves the selected message from the message storage system 225 using the filepath.

Figure 18D:
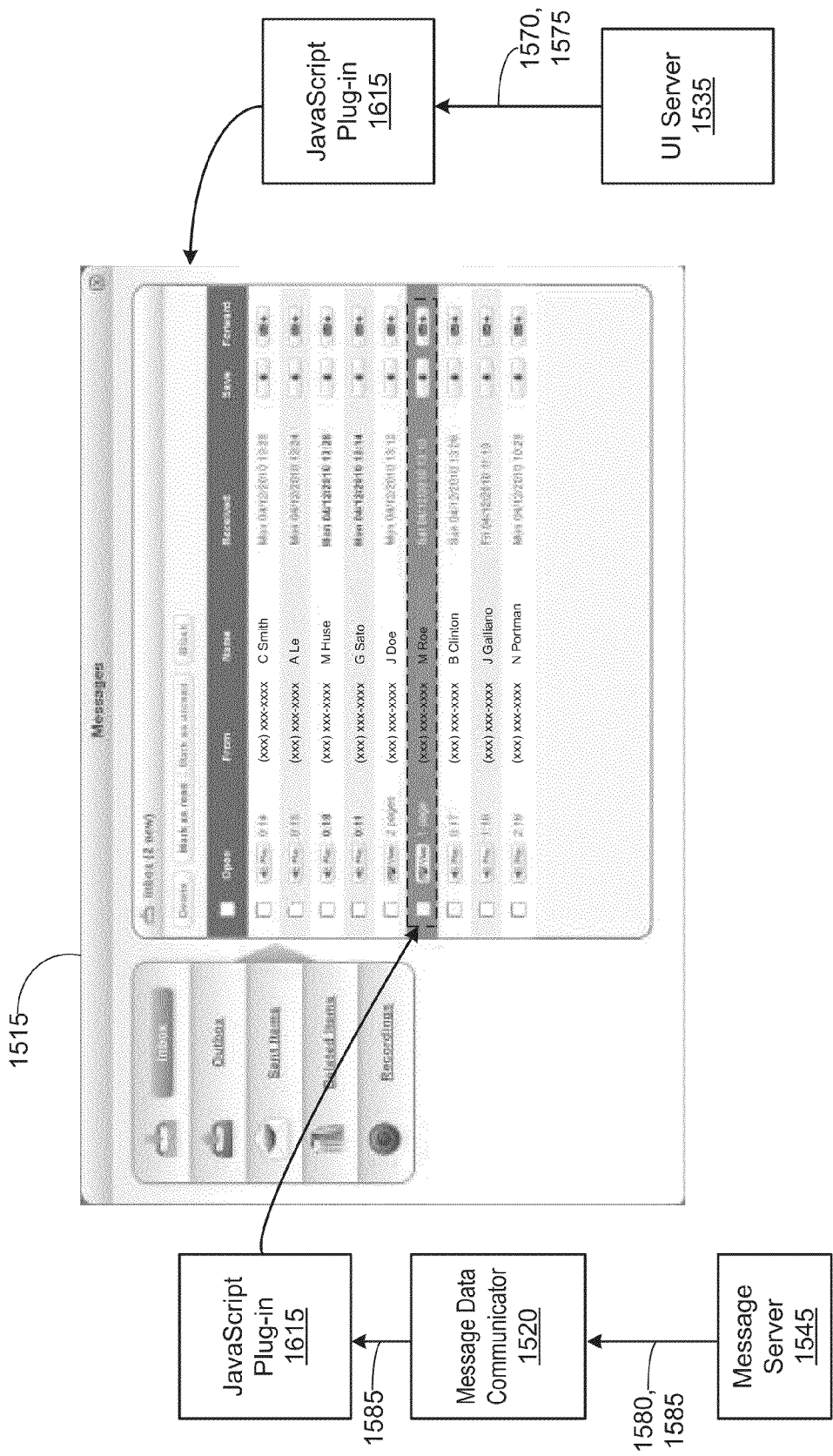

The message server 1545 then sends (at 1785) the selected message to the receiving client device 250 (e.g., through the message load balancer 1540) which presents the selected message. FIG. 18D shows a conceptual diagram of a message being selected for presentation on a message webpage of the HTML UI 1515 in accordance with some embodiments. As shown in FIG. 18D, a message from "M Roe" is selected for presentation. Message data 1585 comprising the selected message is transmitted by the message server 1545 (using the server protocol engine 1550) through the second non-HTTP connection 1580 and received by the message data communicator 1520 (using the client protocol engine 1525), which passes the selected message to the JavaScript plug-in 1615. The JavaScript plug-in 1615 then presents the selected message in the HTML UI 1515.

The user may continually select messages for presentation and select other various message functions, such as message forwarding, message delete, blocking sender, calling sender, etc. The HTML UI 1515 of the receiving client device 250 may then receive (at 1790) a "session-end" request from the user and, in response, sends the session-end request to the message server 1545. For example, the session-end request may comprise a user logout request or a user request to close the message webpage. The message server 1545 receives (at 1795) the "session-end" request which indicates that the message session with the receiving client device 250 has ended. In response, the message server 1545 no longer pushes/sends immediate notifications of new message or calls to the receiving client device 250.

VARIOUS EMBODIMENTS

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information may be represented using any of a variety of different technologies and techniques.

Some embodiments include a computer program product comprising a computer readable medium (media) having instructions stored thereon/in and, when executed (e.g., by a processor), perform methods, techniques, or embodiments described herein, the computer readable medium comprising instructions for performing various steps of the methods, techniques, or embodiments described herein. The computer readable medium may comprise a non-transitory computer readable medium. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, circuits, modules, algorithms, techniques, processes, or method steps of embodiments described herein may be implemented as computer electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The modules, algorithm, techniques, processes, or methods described in connection with embodiments disclosed herein may be embodied directly in computer hardware configured to perform the embodiments disclosed herein, in software executed by a processor, or in a combination of the two. In some embodiments, any software application, program, tool, module, or layer described herein may comprise an engine comprising hardware, software, or a combination of the two configured to perform embodiments described herein. In general, functions of a software application, program, tool, module, or layer described herein may be embodied directly in hardware, or embodied as software executed by a processor, or embodied as a combination of the two.

A software application, layer, or module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

I claim:

1. A message accessing system for accessing messages configured for receiving a plurality of messages through a network connection system from at least one sending client device and storing the messages and message information associated with the messages, the message information for each message specifying an intended receiving client device, the system comprising:
a message storage system;
a message server; and
a user interface (UI) server;
wherein the message storage system:
receives message data through the network connection system from at least one of the sending client devices, the message data comprising at least one message and associated message information for each message specifying a particular intended receiving client device; and
stores the message data;
wherein the message server:
couples to the message storage system;
retrieves only the message data from the message storage system; and
sends only the message data to the intended receiving client device though a first network connection using a non-HyperText Transfer Protocol; and
wherein the UI server:
couples to the message storage system; and
sends only UI data to the intended receiving client device through a second network connection using a HyperText Transfer Protocol, the UI data for producing webpages of a client UI of the intended receiving client device;
wherein the connecting of the message server and the UI server to the intended receiving client device occurs during an overlapping timeframe, and
wherein, during the connecting of the message server and the UI server to the intended receiving client device, the sending of the message data and the sending of the UI data occur during an overlapping timeframe.

2. The system of claim 1, wherein the message server further:
sends a message list of current messages to the intended receiving client device at a beginning of a message session with the intended receiving client device; and
during the message session, sends a notification of at least one of a new message and a call to the intended receiving client device without receiving a request for data from the intended receiving client device, wherein the at least one of new message and new call is not represented in the message list.

3. The system of claim 2, wherein:
the message session ends approximately when the message server receives a session-end request from the intended receiving client device; and
during the message session, the message server automatically sends the notification of the at least one of new message and new call upon receipt of the at least one of new message and new call.

4. The system of claim 1, wherein the message server and the UI server each comprise respective computer systems.

5. The system of claim 1, wherein the connecting of the message server and the UI server to the intended receiving client device occurs during a same timeframe.

6. The system of claim 1, wherein during the connecting of the message server and the UI server to the intended receiving client device, the sending of the message data and the sending of the UI data occur during a same timeframe.

7. The system of claim 1, wherein the message server sends message data comprising a first message type to the intended receiving client device through the first network connection, and further sends message data comprising a second different message type to the intended receiving client device through a third network connection using a second different non-HyperText Transfer Protocol.

8. The system of claim 1, wherein the non-HyperText Transfer Protocol comprises jWebSocket protocol.

9. The system of claim 1, wherein the UI data comprises at least one of HTML formatted text, graphics, tables, and selectable icons for producing the webpages.

10. The system of claim 1, further comprising a program server providing a media UI file in .swf format to the intended receiving client device, wherein the UI data is rendered on the intended receiving client device using the media UI file.

11. The system of claim 1, further comprising a load balancer through which at least one of the message server and the UI server connect to the intended receiving client device.

12. The system of claim 1, further comprising respective load balancers connecting the message server and the UI server to the intended receiving client device.

13. The system of claim 1, wherein the message server connects to the intended receiving client device using a plurality of non-HyperText Transfer Protocol network connections and the UI server connects to the intended receiving client device using a plurality of HyperText Transfer Protocol network connections.

14. A non-transitory computer readable medium having instructions stored thereon that, when executed by a processor, access messages on a message accessing system configured for receiving a plurality of messages through a network connection system from at least one sending client device and storing the messages and message information associated with the messages, the message information for each message specifying an intended receiving client device, the non-transitory computer readable medium comprising instructions for:
at a message storage system:
receiving message data through the network connection system from the at least one sending client device, the message data comprising at least one message and associated message information for each message specifying a particular intended receiving client device; and
storing the message data;
at a message server:
coupling to the message storage system;
retrieving only the message data from the message storage system; and
sending only the message data to the intended receiving client device though a first network connection using a non-HyperText Transfer Protocol; and
at a user interface (UI) server:
coupling to the message storage system; and
sending only UI data to the intended receiving client device through a second network connection using a HyperText Transfer Protocol, the UI data for producing webpages of a client UI of the intended receiving client device;
wherein the connecting of the message server and the UI server to the intended receiving client device occurs during an overlapping timeframe, and
wherein, during the connecting of the message server and the UI server to the intended receiving client device, the sending of the message data and the sending of the UI data occur during an overlapping timeframe.

15. The non-transitory computer readable medium of claim 14, further comprising instructions for, at the message server:
sending a message list of current messages to the intended receiving client device at a beginning of a message session with the intended receiving client device; and
during the message session, sending a notification of at least one of a new message and a call to the intended receiving client device without receiving a request for data from the intended receiving client device, wherein the at least one of new message and new call is not represented in the message list.

16. The non-transitory computer readable medium of claim 15, wherein:
the message session ends approximately when the message server receives a session-end request from the intended receiving client device; and
during the message session, the message server automatically sends the notification of the at least one of new message and new call upon receipt of the at least one of new message and new call.

17. The non-transitory computer readable medium of claim 14, wherein the message server and the UI server each comprise respective computer systems.

18. The non-transitory computer readable medium of claim 14, wherein the connecting of the message server and the UI server to the intended receiving client device occurs during a same timeframe.

19. The non-transitory computer readable medium of claim 14, wherein during the connecting of the message server and the UI server to the intended receiving client device, the sending of the message data and the sending of the UI data occur during a same timeframe.

20. The non-transitory computer readable medium of claim 14, further comprising instructions for, at the message server:
sending message data comprising a first message type to the intended receiving client device through the first network connection; and
sending message data comprising a second different message type to the intended receiving client device through a third network connection using a second different non-HyperText Transfer Protocol.

21. The non-transitory computer readable medium of claim 14, wherein the non-HyperText Transfer Protocol comprises jWebSocket protocol.

22. The non-transitory computer readable medium of claim 14, wherein the UI data comprises at least one of HTML formatted text, graphics, tables, and selectable icons for producing the webpages.

23. The non-transitory computer readable medium of claim 14, further comprising instructions for, at a program server, providing a media UI file in .swf format to the intended receiving client device, wherein the UI data is rendered on the intended receiving client device using the media UI file.

24. The non-transitory computer readable medium of claim 14, further comprising instructions for, at a load balancer, connecting at least one of the message server and the UI server to the intended receiving client device.

25. The non-transitory computer readable medium of claim 14, further comprising instructions for, at respective load balancers, connecting the message server and the UI server to the intended receiving client device.

26. The non-transitory computer readable medium of claim 14, wherein the message server connects to the intended receiving client device using a plurality of non-HyperText Transfer Protocol network connections and the UI server connects to the intended receiving client device using a plurality of HyperText Transfer Protocol network connections.

27. A method for accessing messages on a message accessing system configured for receiving a plurality of messages through a network connection system from at least one sending client device and storing the messages and message information associated with the messages, the message information for each message specifying an intended receiving client device, the method comprising:
at a message storage system:
receiving message data through the network connection system from the at least one sending client device, the message data comprising at least one message and associated message information for each message specifying a particular intended receiving client device; and
storing the message data;
at a message server:
coupling to the message storage system;
retrieving only the message data from the message storage system; and
sending only the message data to the intended receiving client device though a first network connection using a non-HyperText Transfer Protocol; and
at a user interface (UI) server:
coupling to the message storage system; and
sending only UI data to the intended receiving client device through a second network connection using a HyperText Transfer Protocol, the UI data for producing webpages of a client UI of the intended receiving client device;

wherein the connecting of the message server and the UI server to the intended receiving client device occurs during an overlapping timeframe, and wherein, during the connecting of the message server and the UI server to the intended receiving client device, the sending of the message data and the sending of the UI data occur during an overlapping timeframe.

28. The method of claim 27, further comprising, at the message server:

sending a message list of current messages to the intended receiving client device at a beginning of a message session with the intended receiving client device; and during the message session, sending a notification of at least one of a new message and a call to the intended receiving client device without receiving a request for data from the intended receiving client device, wherein the at least one of new message and new call is not represented in the message list.

29. The method of claim 28, wherein:

the message session ends approximately when the message server receives a session-end request from the intended receiving client device; and during the message session, the message server automatically sends the notification of the at least one of new message and new call upon receipt of the at least one of new message and new call.

30. The method of claim 27, wherein the message server and the UI server each comprise respective computer systems.

31. The method of claim 27, wherein the connecting of the message server and the UI server to the intended receiving client device occurs during a same timeframe.

32. The method of claim 27, wherein during the connecting of the message server and the UI server to the intended receiving client device, the sending of the message data and the sending of the UI data occur during a same timeframe.

33. The method of claim 27, further comprising, at the message server:

sending message data comprising a first message type to the intended receiving client device through the first network connection; and sending message data comprising a second different message type to the intended receiving client device through a third network connection using a second different non-HyperText Transfer Protocol.

34. The method of claim 27, wherein the non-HyperText Transfer Protocol comprises jWebSocket protocol.

35. The method of claim 27, wherein the UI data comprises at least one of HTML formatted text, graphics, tables, and selectable icons for producing the webpages.

36. The method of claim 27, further comprising, at a program server, providing a media UI file in .swf format to the intended receiving client device, wherein the UI data is rendered on the intended receiving client device using the media UI file.

37. The method of claim 27, further comprising, at a load balancer, connecting at least one of the message server and the UI server to the intended receiving client device.

38. The method of claim 27, further comprising, at respective load balancers, connecting the message server and the UI server to the intended receiving client device.

39. The method of claim 27, wherein the message server connects to the intended receiving client device using a plurality of non-HyperText Transfer Protocol network connections and the UI server connects to the intended receiving client device using a plurality of HyperText Transfer Protocol network connections.

* * * * *